United States Patent
Griffith

(10) Patent No.: US 11,669,540 B2
(45) Date of Patent: Jun. 6, 2023

(54) MATCHING SUBSETS OF TABULAR DATA ARRANGEMENTS TO SUBSETS OF GRAPHICAL DATA ARRANGEMENTS AT INGESTION INTO DATA-DRIVEN COLLABORATIVE DATASETS

(71) Applicant: data.world, Inc., Austin, TX (US)

(72) Inventor: David Lee Griffith, Austin, TX (US)

(73) Assignee: data.world, Inc., Austin, TX (US)

( * ) Notice: Subject to any disclaimer, the term of this patent is extended or adjusted under 35 U.S.C. 154(b) by 213 days.

(21) Appl. No.: 17/004,570

(22) Filed: Aug. 27, 2020

(65) Prior Publication Data

US 2021/0049184 A1 Feb. 18, 2021

Related U.S. Application Data

(63) Continuation of application No. 16/137,292, filed on Sep. 20, 2018, now Pat. No. 10,824,637, which is a
(Continued)

(51) Int. Cl.
*G06F 7/00* (2006.01)
*G06F 16/25* (2019.01)
(Continued)

(52) U.S. Cl.
CPC .......... *G06F 16/258* (2019.01); *G06F 16/221* (2019.01); *G06F 16/9024* (2019.01)

(58) Field of Classification Search
CPC ... G06F 16/258; G06F 16/221; G06F 16/9024
(Continued)

(56) References Cited

U.S. PATENT DOCUMENTS 6,144,962 A 11/2000 Weinberg et al.
6,317,752 B1 11/2001 Lee et al.
(Continued)

FOREIGN PATENT DOCUMENTS

CA 2820994 A1 1/2014
CN 103425734 B 6/2017
(Continued)

OTHER PUBLICATIONS

"Data.World Comes Out Of Stealth To Make Open Data Easier." Americaninno.com, AustinInno, Jul. 11, 2016, www.americaninno.com/austin/open-data-tech-brett-hurts-startup-data-world-launches/.
(Continued)

*Primary Examiner* — Isaac M Woo
(74) *Attorney, Agent, or Firm* — Kokka & Backus, PC

(57) ABSTRACT

Various embodiments relate generally to data science and data analysis, computer software and systems, and wired and wireless network communications to interface among repositories of disparate datasets and computing machine-based entities configured to access datasets, and, more specifically, to a computing and data storage platform to identify and match equivalent subsets of data between an ingested dataset, such as in a tabular data arrangement, and one or more graph-based data arrangements, according to at least some examples. For example, a method may include identifying a tabular data arrangement including a subset of data as a column, computing a compressed data representation for a column of data, correlating a compressed data representation to a reference compressed data representations, detecting a link between a column of data associated with a correlated compressed data representation to a dataset stored in a graph data arrangement, and forming an expanded tabular data arrangement.

20 Claims, 8 Drawing Sheets

Related U.S. Application Data continuation of application No. 15/985,702, filed on May 22, 2018, now Pat. No. 11,068,475, and a continuation of application No. 15/985,704, filed on May 22, 2018, now Pat. No. 11,068,847, and a continuation of application No. 15/927,004, filed on Mar. 20, 2018, now Pat. No. 11,036,716, and a continuation of application No. 15/926,999, filed on Mar. 20, 2018, now Pat. No. 11,016,931, and a continuation-in-part of application No. 15/454,923, filed on Mar. 9, 2017, now Pat. No. 10,353,911.

(51) Int. Cl.
  *G06F 16/901* (2019.01)
  *G06F 16/22* (2019.01)

(58) Field of Classification Search
  USPC .................................. 707/600–899; 607/693
  See application file for complete search history.

(56) References Cited

U.S. PATENT DOCUMENTS

| | | | |
|---|---|---|---|
| 6,529,909 B1 | 3/2003 | Bowman-Amuah | |
| 6,768,986 B2 | 7/2004 | Cras et al. | |
| 6,961,728 B2 | 11/2005 | Wynblatt et al. | |
| 7,080,090 B2 | 7/2006 | Shah et al. | |
| 7,143,046 B2 * | 11/2006 | Babu | H03M 7/30 |
| | | | 704/500 |
| 7,146,375 B2 | 12/2006 | Egilsson et al. | |
| 7,680,862 B2 | 3/2010 | Chong et al. | |
| 7,702,639 B2 | 4/2010 | Stanley et al. | |
| 7,761,407 B1 | 7/2010 | Stern | |
| 7,836,063 B2 | 11/2010 | Salazar et al. | |
| 7,853,081 B2 | 12/2010 | Thint | |
| 7,856,416 B2 | 12/2010 | Hoffman et al. | |
| 7,877,350 B2 | 1/2011 | Stanfill et al. | |
| 7,953,695 B2 | 5/2011 | Roller et al. | |
| 7,987,179 B2 | 7/2011 | Ma et al. | |
| 8,037,108 B1 | 10/2011 | Chang | |
| 8,060,472 B2 | 11/2011 | Itai et al. | |
| 8,099,382 B2 | 1/2012 | Liu et al. | |
| 8,170,981 B1 | 5/2012 | Tewksbary | |
| 8,275,784 B2 | 9/2012 | Cao et al. | |
| 8,296,200 B2 | 10/2012 | Mangipudi et al. | |
| 8,312,389 B2 | 11/2012 | Crawford et al. | |
| 8,429,179 B1 | 4/2013 | Mirhaji | |
| 8,521,565 B2 | 8/2013 | Faulkner et al. | |
| 8,538,985 B2 | 9/2013 | Betawadkar-Norwood et al. | |
| 8,583,631 B1 | 11/2013 | Ganapathi et al. | |
| 8,616,443 B2 | 12/2013 | Butt et al. | |
| 8,640,056 B2 | 1/2014 | Helfman et al. | |
| 8,719,252 B2 | 5/2014 | Miranker et al. | |
| 8,762,160 B2 | 6/2014 | Lulla | |
| 8,799,240 B2 | 8/2014 | Stowe et al. | |
| 8,831,070 B2 | 9/2014 | Huang et al. | |
| 8,843,502 B2 | 9/2014 | Elson et al. | |
| 8,856,643 B2 | 10/2014 | Drieschner | |
| 8,892,513 B2 | 11/2014 | Forsythe | |
| 8,935,272 B2 | 1/2015 | Ganti et al. | |
| 8,943,313 B2 | 1/2015 | Glew et al. | |
| 8,965,915 B2 | 2/2015 | Ganti et al. | |
| 8,990,236 B2 | 3/2015 | Mizrahy et al. | |
| 8,996,559 B2 | 3/2015 | Ganti et al. | |
| 8,996,978 B2 | 3/2015 | Richstein et al. | |
| 9,002,860 B1 | 4/2015 | Ghemawat | |
| 9,171,077 B2 | 10/2015 | Balmin et al. | |
| 9,218,365 B2 | 12/2015 | Irani et al. | |
| 9,244,952 B2 | 1/2016 | Ganti et al. | |
| 9,268,950 B2 | 2/2016 | Gkoulalas-Divanis et al. | |
| 9,396,283 B2 | 7/2016 | Miranker et al. | |
| 9,495,429 B2 | 11/2016 | Miranker | |
| 9,560,026 B1 | 1/2017 | Worsley | |
| 9,607,042 B2 | 3/2017 | Long | |
| 9,613,152 B2 | 4/2017 | Kucera | |
| 9,659,081 B1 | 5/2017 | Ghodsi et al. | |
| 9,690,792 B2 | 6/2017 | Bartlett et al. | |
| 9,696,981 B2 | 7/2017 | Martin et al. | |
| 9,710,526 B2 | 7/2017 | Couris et al. | |
| 9,710,568 B2 | 7/2017 | Srinivasan et al. | |
| 9,720,958 B2 | 8/2017 | Bagehorn et al. | |
| 9,760,602 B1 | 9/2017 | Ghodsi et al. | |
| 9,769,032 B1 | 9/2017 | Ghodsi et al. | |
| 9,798,737 B2 | 10/2017 | Palmer | |
| 9,836,302 B1 | 12/2017 | Hunter et al. | |
| 9,959,337 B2 | 5/2018 | Ghodsi et al. | |
| 9,990,230 B1 | 6/2018 | Stoica et al. | |
| 10,095,735 B2 | 10/2018 | Ghodsi et al. | |
| 10,102,258 B2 | 10/2018 | Jacob et al. | |
| 10,176,234 B2 | 1/2019 | Gould et al. | |
| 10,216,860 B2 | 2/2019 | Miranker et al. | |
| 10,248,297 B2 | 4/2019 | Beechuk et al. | |
| 10,296,329 B2 | 5/2019 | Hunter et al. | |
| 10,324,925 B2 | 6/2019 | Jacob et al. | |
| 10,346,429 B2 | 7/2019 | Jacob et al. | |
| 10,353,911 B2 | 7/2019 | Reynolds et al. | |
| 10,361,928 B2 | 7/2019 | Ghodsi et al. | |
| 10,438,013 B2 | 10/2019 | Jacob et al. | |
| 10,452,677 B2 | 10/2019 | Jacob et al. | |
| 10,452,975 B2 | 10/2019 | Jacob et al. | |
| 10,474,501 B2 | 11/2019 | Ghodsi et al. | |
| 10,474,736 B1 | 11/2019 | Stoica et al. | |
| 10,545,986 B2 | 1/2020 | Tappan et al. | |
| 10,546,001 B1 | 1/2020 | Nguyen et al. | |
| 10,558,664 B2 | 2/2020 | Armbrust et al. | |
| 10,606,675 B1 | 3/2020 | Luszczak et al. | |
| 10,645,548 B2 | 5/2020 | Reynolds et al. | |
| 10,664,509 B1 | 5/2020 | Reeves et al. | |
| 10,673,887 B2 | 6/2020 | Crabtree et al. | |
| 10,678,536 B2 | 6/2020 | Hunter et al. | |
| 10,691,299 B2 | 6/2020 | Broek et al. | |
| 10,691,433 B2 | 6/2020 | Shankar et al. | |
| 10,769,130 B1 | 9/2020 | Armbrust et al. | |
| 10,769,535 B2 | 9/2020 | Lindsley | |
| 10,810,051 B1 | 10/2020 | Shankar et al. | |
| 2002/0133476 A1 | 9/2002 | Reinhardt | |
| 2002/0143755 A1 | 10/2002 | Wynblatt et al. | |
| 2003/0093597 A1 | 5/2003 | Marshak et al. | |
| 2003/0120681 A1 | 6/2003 | Baclawski | |
| 2003/0208506 A1 | 11/2003 | Greenfield et al. | |
| 2004/0064456 A1 | 4/2004 | Fong et al. | |
| 2005/0010550 A1 | 1/2005 | Potter et al. | |
| 2005/0010566 A1 | 1/2005 | Cushing et al. | |
| 2005/0234957 A1 | 10/2005 | Olson et al. | |
| 2005/0246357 A1 | 11/2005 | Geary et al. | |
| 2005/0278139 A1 | 12/2005 | Glaenzer et al. | |
| 2006/0100995 A1 | 5/2006 | Albornoz et al. | |
| 2006/0117057 A1 | 6/2006 | Legault et al. | |
| 2006/0129605 A1 | 6/2006 | Doshi | |
| 2006/0161545 A1 | 7/2006 | Pura | |
| 2006/0168002 A1 | 7/2006 | Chesley | |
| 2006/0218024 A1 | 9/2006 | Lulla | |
| 2006/0235837 A1 | 10/2006 | Chong et al. | |
| 2007/0027904 A1 | 2/2007 | Chow et al. | |
| 2007/0055662 A1 | 3/2007 | Edelman et al. | |
| 2007/0139227 A1 | 6/2007 | Speirs et al. | |
| 2007/0179760 A1 | 8/2007 | Smith | |
| 2007/0203933 A1 | 8/2007 | Iversen et al. | |
| 2007/0271604 A1 | 11/2007 | Webster et al. | |
| 2007/0276875 A1 | 11/2007 | Brunswig et al. | |
| 2008/0046427 A1 | 2/2008 | Lee et al. | |
| 2008/0091634 A1 | 4/2008 | Seeman | |
| 2008/0140609 A1 | 6/2008 | Werner et al. | |
| 2008/0162550 A1 | 7/2008 | Fey | |
| 2008/0162999 A1 | 7/2008 | Schlueter et al. | |
| 2008/0216060 A1 | 9/2008 | Vargas | |
| 2008/0240566 A1 | 10/2008 | Thint | |
| 2008/0256026 A1 | 10/2008 | Hays | |
| 2008/0294996 A1 | 11/2008 | Hunt et al. | |
| 2008/0319829 A1 | 12/2008 | Hunt et al. | |
| 2009/0006156 A1 | 1/2009 | Hunt et al. | |
| 2009/0013281 A1 | 1/2009 | Helfman et al. | |
| 2009/0018996 A1 | 1/2009 | Hunt et al. | |

(56) References Cited

U.S. PATENT DOCUMENTS

| | | |
|---|---|---|
| 2009/0064053 A1 | 3/2009 | Crawford et al. |
| 2009/0106734 A1 | 4/2009 | Riesen et al. |
| 2009/0119254 A1 | 5/2009 | Cross et al. |
| 2009/0132474 A1 | 5/2009 | Ma et al. |
| 2009/0132503 A1 | 5/2009 | Sun et al. |
| 2009/0138437 A1 | 5/2009 | Krishnamoorthy et al. |
| 2009/0150313 A1 | 6/2009 | Heilper et al. |
| 2009/0157630 A1 | 6/2009 | Yuan |
| 2009/0182710 A1 | 7/2009 | Short et al. |
| 2009/0198693 A1 | 8/2009 | Pura |
| 2009/0234799 A1 | 9/2009 | Betawadkar-Norwood et al. |
| 2009/0300054 A1 | 12/2009 | Fisher et al. |
| 2010/0114885 A1 | 5/2010 | Bowers et al. |
| 2010/0138388 A1 | 6/2010 | Wakeling et al. |
| 2010/0223266 A1 | 9/2010 | Balmin et al. |
| 2010/0235384 A1 | 9/2010 | Itai et al. |
| 2010/0241644 A1 | 9/2010 | Jackson et al. |
| 2010/0250576 A1 | 9/2010 | Bowers et al. |
| 2010/0250577 A1 | 9/2010 | Cao et al. |
| 2010/0268722 A1 | 10/2010 | Yalamanchi et al. |
| 2010/0332453 A1 | 12/2010 | Prahlad et al. |
| 2011/0153047 A1 | 6/2011 | Cameron et al. |
| 2011/0202560 A1 | 8/2011 | Bowers et al. |
| 2011/0283231 A1 | 11/2011 | Richstein et al. |
| 2011/0298804 A1 | 12/2011 | Hao et al. |
| 2012/0016895 A1 | 1/2012 | Butt et al. |
| 2012/0036162 A1 | 2/2012 | Gimbel |
| 2012/0102022 A1 | 4/2012 | Miranker et al. |
| 2012/0154633 A1 | 6/2012 | Rodriguez |
| 2012/0179644 A1 | 7/2012 | Miranker |
| 2012/0254192 A1 | 10/2012 | Gelbard |
| 2012/0278902 A1 | 11/2012 | Martin et al. |
| 2012/0284301 A1 | 11/2012 | Mizrahy et al. |
| 2012/0310674 A1 | 12/2012 | Faulkner et al. |
| 2012/0330908 A1 | 12/2012 | Stowe et al. |
| 2012/0330979 A1 | 12/2012 | Elson et al. |
| 2013/0031208 A1 | 1/2013 | Linton et al. |
| 2013/0031364 A1 | 1/2013 | Glew et al. |
| 2013/0041893 A1 | 2/2013 | Strike |
| 2013/0054517 A1 | 2/2013 | Beechuk et al. |
| 2013/0110775 A1 | 5/2013 | Forsythe |
| 2013/0114645 A1 | 5/2013 | Huang et al. |
| 2013/0138681 A1 | 5/2013 | Abrams et al. |
| 2013/0156348 A1 | 6/2013 | Irani et al. |
| 2013/0238667 A1 | 9/2013 | Carvalho et al. |
| 2013/0262443 A1 | 10/2013 | Leida et al. |
| 2013/0263019 A1 | 10/2013 | Castellanos et al. |
| 2013/0321458 A1 | 12/2013 | Miserendino et al. |
| 2014/0006448 A1 | 1/2014 | McCall |
| 2014/0019426 A1 | 1/2014 | Palmer |
| 2014/0067762 A1 | 3/2014 | Carvalho |
| 2014/0115013 A1 | 4/2014 | Anderson |
| 2014/0119611 A1 | 5/2014 | Prevrhal et al. |
| 2014/0164431 A1 | 6/2014 | Tolbert |
| 2014/0198097 A1 | 7/2014 | Evans |
| 2014/0214857 A1 | 7/2014 | Srinivasan et al. |
| 2014/0229869 A1 | 8/2014 | Chiantera et al. |
| 2014/0236933 A1 | 8/2014 | Schoenbach et al. |
| 2014/0244623 A1 | 8/2014 | King |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280286 A1 | 9/2014 | Ganti et al. |
| 2014/0280287 A1 | 9/2014 | Ganti et al. |
| 2014/0337331 A1 | 11/2014 | Hassanzadeh et al. |
| 2014/0337436 A1 | 11/2014 | Hoagland et al. |
| 2014/0372434 A1 | 12/2014 | Smith et al. |
| 2015/0052125 A1 | 2/2015 | Ellis et al. |
| 2015/0052134 A1 | 2/2015 | Bornea et al. |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0143248 A1 | 5/2015 | Beechuk et al. |
| 2015/0149879 A1 | 5/2015 | Miller et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0242867 A1 | 8/2015 | Prendergast et al. |
| 2015/0269223 A1 | 9/2015 | Miranker et al. |
| 2015/0277725 A1 | 10/2015 | Masterson et al. |
| 2015/0278273 A1 | 10/2015 | Wigington et al. |
| 2015/0278335 A1 | 10/2015 | Opitz et al. |
| 2015/0339572 A1 | 11/2015 | Achin et al. |
| 2015/0356144 A1 | 12/2015 | Chawla et al. |
| 2015/0372915 A1 | 12/2015 | Shen et al. |
| 2015/0379079 A1 | 12/2015 | Kota |
| 2016/0004820 A1 | 1/2016 | Moore |
| 2016/0012059 A1 | 1/2016 | Balmin et al. |
| 2016/0019091 A1 | 1/2016 | Leber et al. |
| 2016/0055184 A1 | 2/2016 | Fokoue-Nkoutche et al. |
| 2016/0063017 A1 | 3/2016 | Bartlett et al. |
| 2016/0063271 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0092476 A1 | 3/2016 | Stojanovic et al. |
| 2016/0098418 A1 | 4/2016 | Dakshinamurthy et al. |
| 2016/0100009 A1 | 4/2016 | Zoldi et al. |
| 2016/0117358 A1 | 4/2016 | Schmid et al. |
| 2016/0117362 A1 | 4/2016 | Bagehorn et al. |
| 2016/0132572 A1 | 5/2016 | Chang et al. |
| 2016/0132608 A1 | 5/2016 | Rathod |
| 2016/0132787 A1 | 5/2016 | Drevo et al. |
| 2016/0147837 A1 | 5/2016 | Nguyen et al. |
| 2016/0162785 A1 | 6/2016 | Grobman |
| 2016/0171380 A1 | 6/2016 | Kennel et al. |
| 2016/0173338 A1 | 6/2016 | Wolting |
| 2016/0188789 A1 | 6/2016 | Kisiel et al. |
| 2016/0203196 A1 | 7/2016 | Schnall-Levin et al. |
| 2016/0232457 A1 | 8/2016 | Gray et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0358102 A1 | 12/2016 | Bowers et al. |
| 2016/0358103 A1 | 12/2016 | Bowers et al. |
| 2016/0371288 A1 | 12/2016 | Biannic et al. |
| 2016/0371355 A1 | 12/2016 | Massari et al. |
| 2017/0017537 A1 | 1/2017 | Razin et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0161341 A1 | 6/2017 | Hrabovsky et al. |
| 2017/0177729 A1 | 6/2017 | Duke et al. |
| 2017/0213004 A1 | 7/2017 | Fox et al. |
| 2017/0220615 A1 | 8/2017 | Bendig et al. |
| 2017/0220667 A1 | 8/2017 | Ghodsi et al. |
| 2017/0228405 A1 | 8/2017 | Ward et al. |
| 2017/0236060 A1 | 8/2017 | Ignatyev |
| 2017/0316070 A1 | 11/2017 | Krishnan et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2017/0371926 A1 | 12/2017 | Shiran et al. |
| 2018/0025027 A1 | 1/2018 | Palmer |
| 2018/0025307 A1 | 1/2018 | Hui et al. |
| 2018/0032327 A1 | 2/2018 | Adami et al. |
| 2018/0040077 A1 | 2/2018 | Smith et al. |
| 2018/0046668 A1 | 2/2018 | Ghodsi et al. |
| 2018/0048536 A1 | 2/2018 | Ghodsi et al. |
| 2018/0121194 A1 | 5/2018 | Hunter et al. |
| 2018/0210936 A1 | 7/2018 | Reynolds et al. |

(56) References Cited

U.S. PATENT DOCUMENTS

| | | |
|---|---|---|
| 2018/0262864 A1 | 9/2018 | Reynolds et al. |
| 2018/0300354 A1 | 10/2018 | Liang et al. |
| 2018/0300494 A1 | 10/2018 | Avidan et al. |
| 2018/0314556 A1 | 11/2018 | Ghodsi et al. |
| 2018/0314705 A1 | 11/2018 | Griffith et al. |
| 2018/0314732 A1 | 11/2018 | Armbrust et al. |
| 2018/0330111 A1 | 11/2018 | Käbisch et al. |
| 2019/0005104 A1 | 1/2019 | Prabhu et al. |
| 2019/0034491 A1 | 1/2019 | Griffith et al. |
| 2019/0042606 A1 | 2/2019 | Griffith et al. |
| 2019/0050445 A1 | 2/2019 | Griffith et al. |
| 2019/0050459 A1 | 2/2019 | Griffith et al. |
| 2019/0057107 A1 | 2/2019 | Bartlett et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0155852 A1 | 5/2019 | Miranker et al. |
| 2019/0258479 A1 | 8/2019 | Hunter et al. |
| 2019/0266155 A1 | 8/2019 | Jacob et al. |
| 2019/0272279 A1 | 9/2019 | Jacob et al. |
| 2019/0295296 A1 | 9/2019 | Gove, Jr. |
| 2019/0317961 A1 | 10/2019 | Brener et al. |
| 2019/0332606 A1 | 10/2019 | Kee et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2020/0073644 A1 | 3/2020 | Shankar et al. |
| 2020/0073865 A1 | 3/2020 | Jacob et al. |
| 2020/0074298 A1 | 3/2020 | Jacob et al. |
| 2020/0097504 A1 | 3/2020 | Sequeda et al. |
| 2020/0117665 A1 | 4/2020 | Jacob et al. |
| 2020/0117688 A1 | 4/2020 | Sequeda et al. |
| 2020/0175012 A1 | 6/2020 | Jacob et al. |
| 2020/0175013 A1 | 6/2020 | Jacob et al. |
| 2020/0201854 A1 | 6/2020 | Miller |
| 2020/0218723 A1 | 7/2020 | Jacob et al. |
| 2020/0241950 A1 | 7/2020 | Luszczak et al. |
| 2020/0252766 A1 | 8/2020 | Reynolds et al. |
| 2020/0252767 A1 | 8/2020 | Reynolds et al. |
| 2020/0257689 A1 | 8/2020 | Armbrust et al. |
| 2020/0301684 A1 | 9/2020 | Shankar et al. |
| 2020/0409768 A1 | 12/2020 | Shankar et al. |
| 2021/0011901 A1 | 1/2021 | Armbrust et al. |
| 2021/0019327 A1 | 1/2021 | Reynolds et al. |
| 2021/0042299 A1 | 2/2021 | Migliori |
| 2021/0081414 A1 | 3/2021 | Jacob et al. |

FOREIGN PATENT DOCUMENTS

| | | |
|---|---|---|
| EP | 2631817 A1 | 8/2013 |
| EP | 2631819 A1 | 8/2013 |
| EP | 2685394 A3 | 6/2017 |
| GB | 2519779 A | 5/2015 |
| JP | 2013175181 A | 9/2013 |
| JP | 2013246828 A | 12/2013 |
| WO | 2012054860 A1 | 4/2012 |
| WO | 2017190153 A1 | 11/2017 |
| WO | 2017222927 A1 | 12/2017 |
| WO | 2018156551 A1 | 8/2018 |
| WO | 2018164971 A1 | 9/2018 |

OTHER PUBLICATIONS

Alaoui et al., "SQL to SPARQL Mapping for RDF querying based on a new Efficient Schema Conversion Technique," International Journal of Engineering Research & Technology (IJERT); ISSN: 2278-0181; vol. 4 Issue 10, Oct. 1, 2015, Retrieved from internet: „https://www.ijert.org/research/sql-to-sparql-mapping-for-rdf-querying-based-on-a-new-efficient-schema-conversion-technique-IJERTV4IS1--1-5.pdf>> Retrieved on Oct. 6, 2020.

Angles, R., Gutierrez. C., "The Expressive Power of SPARQL," Proceedings of the 7th International Semantic Web Conference (ISWC2008). 2008.

Arenas, M., et al., "A Direct Mapping of Relational Data to RDF," W3C Recommendation, Sep. 27, 2012, Retrieved from the Internet [retrieved Mar. 7, 2019].

Beckett, D., Berners-Lee, T., "Turtle-Terse RDF Triple Language," W3C Team Submission, Jan. 14, 2008, Retrieved from the Internet [retrieved Mar. 7, 2019].

Beckett, D., Broekstra, J., "SPARQL Query Results XML Format," W3C Recommendation, Jan. 15, 2008, Retrieved from the Internet [retrieved Mar. 7, 2019].

Beckett, Dave, "RDF/XML Syntax Specification (Revised)," W3C Recommendation, Feb. 10, 2004, Retrieved from the Internet [retrieved Mar. 7, 2019].

Berners-Lee, Tim, "Notation 3," 2006, Retrieved from the Internet [retrieved on Mar. 7, 2019].

Berners-Lee, Tim, "Linked Data," 2009, Retrieved from the Internet [retrieved on Mar. 7, 2019].

Boutros et al., "Computerized Tools To Develop and Manage Data-Driven Projects Collaboratively Via a Networked Computing Platform and Collaborative Datasets," U.S. Appl. No. 15/985,702, filed May 22, 2018.

Boutros et al., "Computerized Tools To Facilitate Data Project Development Via Data Access Layering Logic in a Networked Computing Platform Including Collaborative Datasets," U.S. Appl. No. 15/985,704, filed May 22, 2018.

Boutros et al., "Dynamic Composite Data Dictionary To Facilitate Data Operations Via Computerized Tools Configured To Access Collaborative Datasets in a Networked Computing Platform," U.S. Appl. No. 15/985,705, filed May 22, 2018.

Boutros et al., "Graphical User Interface for a Display Screen or Portion Thereof," U.S. Appl. No. 29/648,465, filed May 22, 2018.

Boutros et al., "Graphical User Interface for a Display Screen or Portion Thereof," U.S. Appl. No. 29/648,466, filed May 22, 2018.

Boutros et al., "Graphical User Interface for a Display Screen or Portion Thereof," U.S. Appl. No. 29/648,467, filed May 22, 2018.

Brener et al., "Computerized Tools Configured To Determine Subsets of Graph Data Arrangements for Linking Relevant Data To Enrich Datasets Associated With a Data-Driven Collaborative Dataset Platform," U.S. Appl. No. 16/395,036, filed Apr. 25, 2019.

Brickley, D., Guha, R.V., "RDF Vocabulary Description Language 1.0: RDF Schema," W3C Recommendation, Feb. 10, 2004, Retrieved from the Internet [retrieved Mar. 7, 2019].

Buche et al., "Flexible SPARQL Querying of Web Data Tables Driven by an Ontology," FQAS 2009, LNAI 5822, Springer, 2009, pp. 345-357.

Bullock, Joshua, Final Office Action dated Jan. 22, 2019 for U.S. Appl. No. 15/439,908.

Bullock, Joshua, Final Office Action dated Jan. 22, 2019 for U.S. Appl. No. 15/439,911.

Bullock, Joshua, Final Office Action dated Oct. 30, 2018 for U.S. Appl. No. 15/186,517.

Bullock, Joshua, Non-Final Office Action dated Jul. 12, 2018 for U.S. Appl. No. 15/186,517.

Bullock, Joshua, Non-Final Office Action dated Jun. 28, 2018 for U.S. Appl. No. 15/439,908.

Bullock, Joshua, Non-Final Office Action dated Jun. 28, 2018 for U.S. Appl. No. 15/439,911.

Clark, K., Feigenbaum, L., Torres, E., "SPARQL Protocol for RDF," W3C Recommendation, Jan. 15, 2008, Retrieved from the Internet [retrieved Mar. 7, 2019].

Copenheaver, Blaine R., Notification of Transmittal of the International Search Report and the Written Opinion of the International Searching Authority, or the Declaration dated Jul. 5, 2017 for International Patent Application No. PCT/US2017/030474.

(56) References Cited

OTHER PUBLICATIONS

Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "OWL Web Ontology Language Reference," W3C Recommendation, Feb. 10, 2004, Retrieved from the Internet [retrieved Mar. 7, 2019].
Doung, Hien, Non-Final Office Action dated Dec. 9, 2020 for U.S. Appl. No. 16/899,544.
Dwivedi, Mahesh H., Non-Final Office Action dated Jan. 30, 2020 for U.S. Appl. No. 15/454,955.
Ellis, Matthew J., Non-Final Office Action dated Sep. 25, 2020 for U.S. Appl. No. 16/139,374.
European Patent Office, Extended European Search Report for European Patent Application No. 18757122.9 dated Oct. 15, 2020.
European Patent Office, Extended European Search Report for European Patent Application No. 18763855.6 dated Sep. 28, 2020.
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I., Kesselman, C., Nick, J., Tuecke, S., "The Physiology of the Grid: An Open Grid Services Architecture for Distributed Systems Integration," Technical Report, Global Grid Forum (2002).
Ganti et al., U.S. Appl. No. 14/058,184, filed Oct. 18, 2013 and entitled, "Assisted Query Formation, Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,206, filed Oct. 18, 2013 and entitled, "Curated Answers Community Automatically Populated Through User Query Monitoring."
Ganti et al., U.S. Appl. No. 14/058,208, filed Oct. 18, 2013 and entitled, "Editable and Searchable Markup Pages Automatically Populated Through User Query Monitoring."
Ganti et al., U.S. Appl. No. 61/802,716, filed Mar. 17, 2013 and entitled, "Data Profile Driven Query Builder."
Griffith et al., "Layered Data Generation and Data Remediation To Facilitate Formation of Interrelated Data in a System of Networked Collaborative Datasets," U.S. Appl. No. 15/927,004, filed Mar. 20, 2018.
Griffith et al., "Link-Formative Auxiliary Queries Applied At Data Ingestion To Facilitate Data Operations in a System of Networked Collaborative Datasets," U.S. Appl. No. 15/943,633, filed Apr. 2, 2018.
Griffith et al., "Localized Link Formation To Perform Implicitly Federated Queries Using Extended Computerized Query Language Syntax," U.S. Appl. No. 16/036,836, filed Jul. 16, 2018.
Griffith et al., "Transmuting Data Associations Among Data Arrangements To Facilitate Data Operations in a System of Networked Collaborative Datasets," U.S. Appl. No. 15/943,629, filed Apr. 2, 2018.
Griffith, David Lee, "Determining a Degree of Similarity of a Subset of Tabular Data Arrangements To Subsets of Graph Data Arrangements At Ingestion Into a Data-Driven Collaborative Dataset Platform," U.S. Appl. No. 16/137,297, filed Sep. 20, 2018.
Griffith, David Lee, "Matching Subsets of Tabular Data Arrangements To Subsets of Graphical Data Arrangements At Ingestion Into Data Driven Collaborative Datasets," U.S. Appl. No. 16/137,292, filed Sep. 20, 2018.
Griffith, David Lee, "Predictive Determination of Constraint Data for Application With Linked Data in Graph-Based Datasets Associated With a Data-Driven Collaborative Dataset Platform," U.S. Appl. No. 16/139,374, filed Sep. 24, 2018.
Haveliwala et al., "Evaluating Strategies for Similarity Search on the Web," Proceedings of the 11th international conference on World Wide Web, May 7-11, 2002, Honolulu, Hawaii, USA (ACM), p. 432-442.
Hayes, Patrick, "RDF Semantics," W3C Recommendation, Feb. 10, 2004, Retrieved from the Internet [retrieved Mar. 7, 2019].
Heflin, J., "OWL Web Ontology Language Use Cases and Requirements," W3C Recommendation, Feb. 10, 2004, Retrieved from the Internet [retrieved Mar. 7, 2019].
Hoang, Hau Hai, Final Office Action dated Jul. 30, 2019 for U.S. Appl. No. 15/186,515.
Hoang, Hau Hai, Final Office Action dated Nov. 26, 2018 for U.S. Appl. No. 15/186,515.
Hoang, Hau Hai, Non-Final Office Action dated Apr. 16, 2019 for U.S. Appl. No. 15/186,515.
Hoang, Hau Hai, Non-Final Office Action dated May 3, 2018 for U.S. Appl. No. 15/186,515.
Htay, Lin Lin M., Non-Final Office Action dated Sep. 14, 2018 for U.S. Appl. No. 15/186,516.
Htay, Lin Lin M., Notice of Allowance and Fee(s) Due and Notice of Allowability for U.S. Appl. No. 15/186,516, dated Jan. 25, 2019.
Hu, Xiaoqin, Final Office Action dated Apr. 5, 2019 for U.S. Appl. No. 15/454,969.
Hu, Xiaoqin, Final Office Action dated Apr. 5, 2019 for U.S. Appl. No. 15/454,981.
Hu, Xiaoqin, Final Office Action dated Oct. 31, 2019 for U.S. Appl. No. 15/454,969.
Hu, Xiaoqin, Final Office Action dated Sep. 24, 2019 for U.S. Appl. No. 15/454,981.
Hu, Xiaoqin, Non-Final Office Action for U.S. Appl. No. 15/454,969 dated Dec. 7, 2018.
Hu, Xiaoqin, Non-Final Office Action for U.S. Appl. No. 15/454,981 dated Dec. 12, 2018.
Hu, Xiaoqin, Non-Final Office Action dated Aug. 1, 2019 for U.S. Appl. No. 15/454,981.
Hu, Xiaoqin, Non-Final Office Action dated Jul. 26, 2019 for U.S. Appl. No. 15/454,969.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Jacob et al., "Collaborative Dataset Consolidation Via Distributed Computer Networks," U.S. Appl. No. 16/120,057, filed Aug. 31, 2018.
Jacob et al., "Collaborative Dataset Consolidation Via Distributed Computer Networks," U.S. Appl. No. 16/287,967, filed Feb. 27, 2019.
Jacob et al., "Dataset Analysis and Dataset Attribute Inferencing To Form Collaborative Datasets," U.S. Appl. No. 16/271,263, filed Feb. 8, 2019.
Jacob et al., "Dataset Analysis and Dataset Attribute Inferencing To Form Collaborative Datasets," U.S. Appl. No. 16/292,120, filed Mar. 4, 2019.
Jacob et al., "Management of Collaborative Datasets Via Distributed Computer Networks," U.S. Appl. No. 16/271,687, filed Feb. 8, 2019.
Jacob et al., "Management of Collaborative Datasets Via Distributed Computer Networks," U.S. Appl. No. 16/292,135, filed Mar. 4, 2019.
Jacob et al., "Platform Management of Integrated Access of Public and Privately-Accessible Datasets Utilizing Federated Query Generation and Schema Rewriting Optimization," International Patent Application No. PCT/US2018/018906 filed Feb. 21, 2018.
Jacob et al., "Query Generation for Collaborative Datasets," U.S. Appl. No. 16/395,043, filed Apr. 25, 2019.
Jacob et al., "Query Generation for Collaborative Datasets," U.S. Appl. No. 16/395,049, filed Apr. 25, 2019.
Joshi, Amit Krishna et al., "Alignment-based Querying of Linked Open Data," Lecture Notes in Computer Science, 7566, 807-824, 2012.
Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.

(56) References Cited

OTHER PUBLICATIONS

Khong, Alexander, Non-Final Office Action for U.S. Appl. No. 15/165,775, dated Jun. 14, 2018.
Klyne, G., Carroll, J., "Resource Description Framework (RDF): Concepts and Abstract Syntax," W3C Recommendation, Feb. 10, 2004, Retrieved from the Internet [retrieved Mar. 7, 2019].
Krishnan et al., U.S. Appl. No. 15/583,966, filed May 1, 2017 and titled "Automatic Generation of Structured Data from Semi-Structured Data."
Langedgger, Andreas, "XL Wrap—Spreadsheet-to-RDF Wrapper," 2009, Retrieved from the Internet [retrieved Mar. 7, 2019].
Lee, Mark B., Non-Final Office Action for U.S. Appl. No. 13/180,444 dated Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet [retrieved Mar. 7, 2019].
Martin et al., U.S. Appl. No. 13/457,925, filed Apr. 27, 2012 and titled "Incremental Deployment of Computer Software Program Logic."
McGuiness, D., Van Harmelen, F., "OWL Web Ontology Language Overview," W3C Recommendation, Feb. 10, 2004, Retrieved from the Internet [retrieved Mar. 7, 2019].
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet [retrieved Mar. 7, 2019].
Nguyen, Kim T., Non-Final Office Action dated Dec. 10, 2020 for U.S. Appl. No. 16/137,297.
Nguyen, Kim T., Non-Final Office Action dated Dec. 8, 2020 for U.S. Appl. No. 15/985,704.
Nguyen, Kim T., Non-Final Office Action dated Jun. 14, 2018 for U.S. Appl. No. 15/186,514.
Nguyen, Kim T., Non-Final Office Action dated Mar. 20, 2019 for U.S. Appl. No. 15/454,923.
Nguyen, Kim T., Non-Final Office Action dated Nov. 24, 2020 for U.S. Appl. No. 16/036,834.
Nguyen, Kim T., Non-Final Office Action dated Nov. 24, 2020 for U.S. Appl. No. 16/036,836.
Nguyen, Kim T., Non-Final Office Action dated Nov. 27, 2020 for U.S. Appl. No. 15/985,705.
Nguyen, Kim T., Non-Final Office Action dated Oct. 14, 2020 for U.S. Appl. No. 15/943,629.
Nguyen, Kim T., Non-Final Office Action dated Oct. 14, 2020 for U.S. Appl. No. 15/943,633.
Nguyen, Kim T., Non-Final Office Action dated Oct. 27, 2020 for U.S. Appl. No. 15/985,702.
Nguyen, Kim T., Non-Final Office Action dated Oct. 5, 2020 for U.S. Appl. No. 15/927,004.
Nguyen, Kim T., Non-Final Office Action dated Oct. 5, 2020 for U.S. Appl. No. 15/927,006.
Nguyen, Kim T., Non-Final Office Action dated Sep. 21, 2020 for U.S. Appl. No. 15/926,999.
Nguyen, Kim T., Notice of Allowance and Fee(s) Due dated Mar. 16, 2021 for U.S. Appl. No. 15/985,702.
Nguyen, Kim T., Notice of Allowance and Fee(s) Due dated Mar. 16, 2021 for U.S. Appl. No. 16/137,297.
Nguyen, Kim T., Notice of Allowance and Fee(s) Due dated Mar. 17, 2021 for U.S. Appl. No. 15/985,704.
Nguyen, Kim T., Notice of Allowance and Fee(s) Due dated Mar. 31, 2021 for U.S. Appl. No. 15/985,705.
Nguyen, Kim T., Notice of Allowance and Fee(s) Due, dated May 15, 2019 for U.S. Appl. No. 15/454,923.
Niinimaki et al., "An ETL Process for OLAP Using RDF/OWL Ontologies," Journal on Data Semantics XIII, LNCS 5530, Springer, pp. 97-119, Aug. 12, 2009.
Pandit et al., "Using Ontology Design Patterns To Define SHACL Shapes," CEUR Workshop Proceedings, Proceedings of the 9th Workshop on Ontology Design and Patterns (WOP 2018), Monterey, USA, Oct. 9, 2018.
Parashar et al., U.S. Appl. No. 62/329,982, filed Apr. 29, 2016 and titled "Automatic Parsing of Semi-Structured Data and Identification of Missing Delimiters."
Patel-Schneider, P., Hayes, P., Horrocks, I., "OWL Web Ontology Language Semantics and Abstract Syntax," W3C Recommendation, Feb. 10, 2004, Retrieved from the Internet [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet [retrieved Mar. 7, 2019].
Raab, Christopher J., Non-Final Office Action dated Jul. 24, 2020 for U.S. Appl. No. 16/271,687.
Raab, Christopher J., Non-Final Office Action dated Jun. 28, 2018 for U.S. Appl. No. 15/186,520.
Raab, Christopher J., Non-Final Office Action dated Oct. 16, 2020 for U.S. Appl. No. 16/287,967.
Raab, Christopher J., Notice of Allowance and Fee(s) Due and Notice of Allowability for U.S. Appl. No. 15/186,520, dated Jan. 2, 2019.
Rachapalli et al., "RETRO: A Framework for Semantics Preserving SQL-to-SPARQL Translation," The University of Texas at Dallas; Sep. 18, 2011, XP055737294, Retrieved from internet: <> Retrieved on Oct. 6, 2020.
RDB2RDF Working Group Charter, Sep. 2009, Retrieved from the Internet [retrieved Mar. 7, 2019].
Reynolds et al., "Computerized Tool Implementation of Layered Data Files To Discover, Form, or Analyze Dataset Interrelations of Networked Collaborative Datasets," U.S. Appl. No. 15/454,981, filed Mar. 9, 2017.
Reynolds et al., "Computerized Tools To Discover, Form, and Analyze Dataset Interrelations Among a System of Networked Collaborative Datasets," International Patent Application No. PCT/US2018/020812 filed Mar. 3, 2018.
Reynolds et al., "Interactive Interfaces To Present Data Arrangement Overviews and Summarized Dataset Attributes for Collaborative Datasets," U.S. Appl. No. 15/454,969, filed Mar. 9, 2017.
Sahoo, S., et al., "A Survey of Current Approaches for Mapping of Relational Databases to RDF," W3C RDB2RDF XG Report, Incubator Group, Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.
Sequeda, J., et al., "Direct Mapping SQL Databases to the Semantic Web," Technical Report 09-04. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.
Sequeda, J., Tirmizi, S., Miranker, D., "SQL Databases are a Moving Target," Position Paper for W3C Workshop on RDF Access to Relational Databases, Cambridge, MA, USA, 2007.
Skevakis, Giannis et al., Metadata management, interoperability and Linked Data publishing support for Natural History Museums, Int J Digit Libr (2014), published online: Apr. 11, 2014; Springer-Verlag Berlin Heidelberg.
Smith, M., Welty, C., McGuiness, D., "OWL Web Ontology Language Guide," W3C Recommendation, Feb. 10, 2004, Retrieved from the Internet [retrieved Mar. 7, 2019].
Vy, Hung T., Final Office Action for U.S. Appl. No. 13/180,444 dated Dec. 3, 2014.
Vy, Hung T., Final Office Action for U.S. Appl. No. 13/180,444 dated Dec. 9, 2015.
Vy, Hung T., Final Office Action for U.S. Appl. No. 13/180,444 dated Feb. 22, 2013.

(56) References Cited

OTHER PUBLICATIONS

Vy, Hung T., Non-Final Office Action for U.S. Appl. No. 13/180,444 dated Jun. 18, 2015.
Vy, Hung T., Non-Final Office Action for U.S. Appl. No. 13/180,444 dated Mar. 26, 2014.
Vy, Hung T., Non-Final Office Action for U.S. Appl. No. 15/273,930 dated Dec. 20, 2017.
Woo, Isaac M., Non-Final Office Action dated May 5, 2020 for U.S. Appl. No. 16/137,292.
Yen, Syling, Final Office Action dated Apr. 10, 2019 for U.S. Appl. No. 15/186,519.
Yen, Syling, Final Office Action dated Oct. 25, 2019 for U.S. Appl. No. 15/186,519.
Yen, Syling, Non-Final Office Action dated Feb. 8, 2019 for U.S. Appl. No. 15/186,519.
Yen, Syling, Non-Final Office Action dated Sep. 12, 2019 for U.S. Appl. No. 15/186,519.
Yotova, Polina, Supplementary European Search Report and Examiner Search Opinion for European Patent Application No. 17815970.3, dated Feb. 21, 2020.
Young, Lee W., International Searching Authority, Notification of Transmittal of the International Search Report and the Written Opinion of the International Searching Authority, or the Declaration for International Patent Application No. PCT/US2017/037846, dated Nov. 9, 2017.
Young, Lee W., International Searching Authority, Notification of Transmittal of the International Search Report and the Written Opinion of the International Searching Authority, or the Declaration for International Patent Application No. PCT/US2018/020812, dated Aug. 8, 2018.
Young, Lee W., Invitation to Pay Additional Fees And, Where Applicable, Protest Fee, dated Jun. 14, 2018 for International Application No. PCT/US2018/020812.
Young, Lee W., Notification of Transmittal of the International Search Report and the Written Opinion of the International Searching Authority, or the Declaration dated May 29, 2018 for International Patent Application No. PCT/US2018/018906.
Young, Lee W., Notification of Transmittal of the International Search Report and the Written Opinion of the International Searching Authority, or the Declaration for International Application No. PCT/US2011/057334, dated Mar. 22, 2012.
Ganti et al., U.S. Appl. No. 61/802,742, filed Mar. 18, 2013 and entitled, "Developing a Social Data Catalog By Crowd-Sourcing."
Ganti et al., U.S. Appl. No. 61/802,743, filed Mar. 18, 2013 and entitled, "Creating a Data Catalog By Mining Queries."
Ganti et al., U.S. Appl. No. 61/802,744, filed Mar. 18, 2013 and entitled, "Auto-Completion of Queries With Data Object Names and Data Profiles."
Garcia-Molina, H., Ullman, J., Widom, J., Database Systems: The Complete Book. Editorial Pearson Prentice Hall. Second Edition.
Gawinecki, Maciej, "How schema mapping can help in data integration?—integrating the relational databases with ontologies," ITC School, Computer Science, XXIII Cycle DII, University of Modena and Reggio Emilia, Italy, 2008.
Gillin, Paul, "Neo4j Connector Integrates Graph Data With Business Intelligence Tools," SiliconANGLE, Published Mar. 24, 2020, Retrieved from on Mar. 25, 2020.
Girma, Anteneh B., Final Office Action for U.S. Appl. No. 13/278,907, dated Apr. 18, 2013.
Girma, Anteneh B., Non-Final Office Action for U.S. Appl. No. 13/278,907, dated Jul. 25, 2012.
Smith, T.F., Waterman, M.S., "Identification of Common Molecular Subsequences," J. Mol. Biol. 147, 195-197 (1981).
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.
U.S. Appl. No. 16/251,408, filed Jan. 18, 2019.
Uddin, Md I., Final Office Action dated Jan. 1, 2021 for U.S. Appl. No. 16/404,113.
Uddin, Md I., Non-Final Office Action dated Oct. 6, 2020 for U.S. Appl. No. 16/404,113.
Ultrawrap Mapper, U.S. Appl. No. 62/169,268, filed Jun. 1, 2015 (Expired).
Griffith et al., "Aggregation of Ancillary Data Associated With Source Data in a System of Networked Collaborative Datasets," U.S. Appl. No. 15/927,006, filed Mar. 20, 2018.
Griffith et al., "Data Ingestion To Generate Layered Dataset Interrelations To Form a System of Networked Collaborative Datasets," U.S. Appl. No. 15/926,999, filed Mar. 20, 2018.
Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.
Martin et al., U.S. Appl. No. 61/479,621, filed Apr. 27, 2011 and titled "Incremental Deployment of Computer Software Program Logic."
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).

* cited by examiner

MATCHING SUBSETS OF TABULAR DATA ARRANGEMENTS TO SUBSETS OF GRAPHICAL DATA ARRANGEMENTS AT INGESTION INTO DATA-DRIVEN COLLABORATIVE DATASETS

CROSS-REFERENCE TO RELATED APPLICATIONS

This application is a continuation application of U.S. patent application Ser. No. 16/137,292 filed on Sep. 20, 2018 and titled, "Matching Subsets of Tabular Data Arrangements to Subsets of Graphical Data Arrangements at Ingestion into Data Driven Collaborative Datasets," U.S. patent application Ser. No. 16/137,292 is a continuation-in-part application of U.S. patent application Ser. No. 15/454,923, filed on Mar. 9, 2017 and titled "Computerized Tools To Discover, Form, And Analyze Dataset Interrelations Among A System Of Networked Collaborative Datasets," U.S. patent application Ser. No. 16/137,292 is also a continuation application of U.S. patent application Ser. No. 15/926,999, filed on Mar. 20, 2018 and titled "Data Ingestion To Generate Layered Dataset Interrelations To Form A System Of Networked Collaborative Datasets," U.S. patent application Ser. No. 16/137,292 is also a continuation application of U.S. patent application Ser. No. 15/927,004, filed on Mar. 20, 2018 and titled "Layered Data Generation And Data Remediation To Facilitate Formation Of Interrelated Data In A System Of Networked Collaborative Datasets," U.S. patent application Ser. No. 16/137,292 is also a continuation application of U.S. patent application Ser. No. 15/985,702, filed on May 22, 2018 and titled "Computerized Tools To Develop And Manage Data-Driven Projects Collaboratively Via A Networked Computing Platform And Collaborative Datasets," U.S. patent application Ser. No. 16/137,292 is also a continuation application of U.S. patent application Ser. No. 15/985,704, filed on May 22, 2018 and titled "Computerized Tools To Facilitate Data Project Development Via Data Access Layering Logic In A Networked Computing Platform Including Collaborative Datasets," all of which are herein incorporated by reference in their entirety for all purposes.

FIELD

Various embodiments relate generally to data science and data analysis, computer software and systems, and wired and wireless network communications to interface among repositories of disparate datasets and computing machine-based entities configured to access datasets, and, more specifically, to a computing and data storage platform to identify and match equivalent subsets of data between an ingested dataset, such as in a tabular data arrangement, and one or more graph-based data arrangements, according to at least some examples.

BACKGROUND

Advances in computing hardware and software have fueled exponential growth in the generation of vast amounts of data due to increased computations and analyses in numerous areas, such as in the various scientific and engineering disciplines, as well as in the application of data science techniques to endeavors of good-will (e.g., areas of humanitarian, environmental, medical, social, etc.). Also, advances in conventional data storage technologies provide an ability to store an increasing amount of generated data. Consequently, traditional data storage and computing technologies have given rise to a phenomenon in which numerous disparate datasets can reach sizes and complexities that traditional data-accessing and analytic techniques are generally not well-suited for assessing conventional datasets.

Conventional technologies for implementing datasets typically rely on different computing platforms and systems, different database technologies, and different data formats, such as CSV, TSV, HTML, JSON, XML, etc. Known data-distributing technologies are not well-suited to enable interoperability among datasets. Thus, many typical datasets are warehoused in conventional data stores, which are known as "data silos." These data silos have inherent barriers that insulate and isolate datasets. Further, conventional data systems and dataset accessing techniques are generally incompatible or inadequate to facilitate data interoperability among the data silos. Various, ad hoc and non-standard approaches have been adopted, but each standard approach is driven by different data practitioners each of whom favor a different, personalized process.

As table-based data structures in relational databased architectures grow at increasing rates (e.g., at arithmetical or exponential rates), the complexity with which to match data between a newly-uploaded dataset and previously-uploaded datasets increases correspondingly. Typically, datasets of various types of formats, such as CSV, TSV, HTML, JSON, WL, etc., require additional processing, including manual intervention, to identify related datasets that may be disposed, for example, in graph-based data arrangements. For instance, some conventional data formats are designed for relational database architectures, which generally are known for being difficult to scale as data and related datasets increase in size. As such, relational databases of large sizes are not well-suited for expeditiously identifying classes or types of data over large-scaled data arrangements with which to join a newly-added dataset.

Thus, what is needed is a solution for facilitating techniques to optimize data operations applied to datasets to identify equivalent data, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
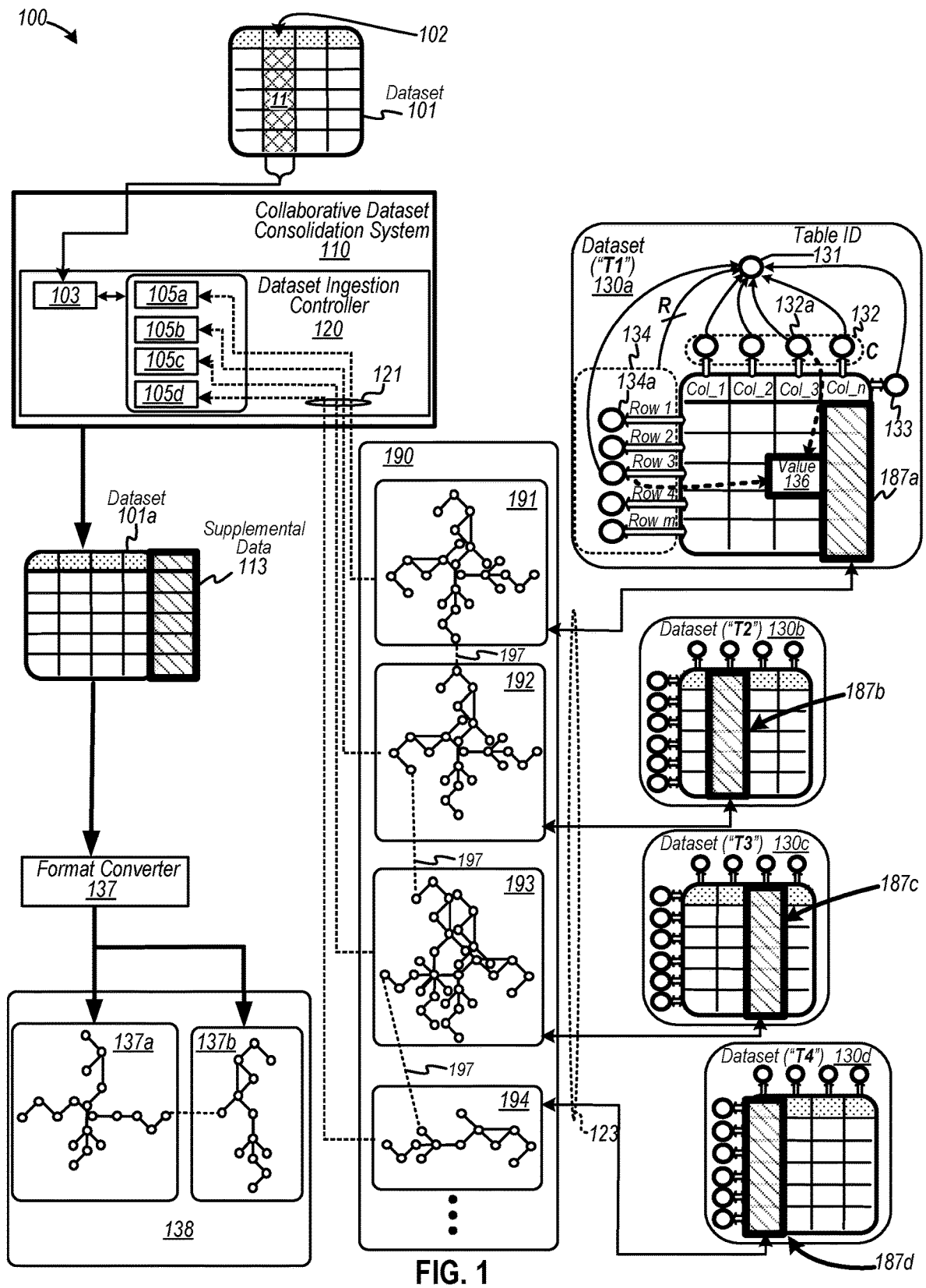
FIG. 1 is a diagram depicting an example of a collaborative dataset consolidation system configured to identify relevant data of an ingested dataset with one or more linked datasets, according to some embodiments.

FIG. 1 is a diagram depicting an example of a collaborative dataset consolidation system configured to identify relevant data of an ingested dataset with one or more linked datasets, according to some embodiments. Diagram 100 depicts a tabular data arrangement that may be ingested into a collaborative dataset consolidation system 110, wherein a tabular data arrangement 101 may include subsets of data. An example of a subset of data may include data (e.g., columnar data) disposed in column 102, and, in some examples, may include a portion of an external dataset that may be ingested. Each unit of columnar data may be disposed in data fields, such as cells 11, of data arrangement 101. In some examples, tabular data arrangement 101 may be implemented as a data file including multiple tables divided, at least visually in presentation, into different files or sheets, such as a data arrangement for a spreadsheet computer program application.

Diagram 100 further depicts collaborative dataset consolidation system 110 including a dataset ingestion controller 120, which may be configured to identify which data of ingested dataset 101 may be relevant to one or more linked datasets, such as graph-based data sets 191, 192, 193, and 194 stored in a graph data arrangement 190. Dataset ingestion controller 120 (and/or any of its constituent components) also may be configured to compute a compressed data representation 103 for one or more columns 102 of data. In some cases, a unique value for each of compressed data representation 103 may be computed for each different column 102 of dataset 101. A compressed data representation may be indicative of a classification type to which the columnar data is associated, and thus may be used to identify equivalent or similar classifications of data. According to some examples, dataset ingestion controller 120 (and/or any of its constituent components) may be configured to compute reference compressed data representations 105a to 105d for other subsets of data that may, for example, be ingested prior to data 101. Reference compressed data representations 105a to 105d may be generated and stored in a data structure, such as a probabilistic data structure, which may be implemented as a match filter, according to some examples.

Compressed data representations 105a to 105d each may configured to match a subset of unique (or nearly unique) digital signatures, at least one of which being associated with columnar data in column 102. Compressed data representations 105a to 105d each may reference subsets of data disposed in graph data arrangement 190 that may be similar or equivalent to that in column 102. In this example, dataset ingestion controller 120 may be configured to implement data representing a number of reference compressed data representations 105a, 105b, 105c, and 105d, among others, whereby reference compressed data representations 105a, 105b, 105c, and 105d may be stored in, or associated with, a filtering data structure against which data may be compared to determine whether a match exists. Reference compressed data representations 105a, 105b, 105c, and 105d each may be a compressed, digital representation that uniquely or (nearly uniquely) identifies at least one type of data (or classification type of data). As shown, reference compressed data representations 105a, 105b, 105c, and 105d may identify portions 191, 192, 193, and 194, respectively, of a graph data arrangement 190. As indicated above, reference compressed data representations 105a, 105b, 105c, and 105d may be implemented in a probabilistic data structure as a match filter, according to some embodiments. Hence, dataset ingestion controller 120 may determine a match between compressed data representation 103 and one of reference compressed data representation by applying or comparing compressed data representation 103 against multiple match filters each of which may be associated with one of reference compressed data representations 105a, 105b, 105c, and 105d. A match may indicate similar or equivalent data types (e.g., similar or equivalent classification types or entity classes).

In some examples, a classification type may describe a "classification," or an "entity class," under which data may be categorized. Examples of classification types include postal zip codes, industry sector codes, such as NACIS ("North American Cartographic Information Society") codes or SIC ("Standard Industrial Classification") codes, country codes (e.g., two-character, three-character, etc.), airport codes, animal taxonomies (e.g., classifications of "fish" or any other animal), state codes (e.g., two-letter abbreviation, such as TX for Texas, etc.), medical codes, such as ICD ("International Classification of Diseases") codes, including the ICD-10-CM revision, airport codes, such as three-letter "IATA" codes defined by the International Air Transport Association, and the like. The above-described examples are non-limiting, and a classification type or entity class of data may describe any type of data that can be categorized, such as any data set forth in an ontology (e.g., data defining categories, properties, data relationships, concepts, entities, etc.). An example of one type of ontology is an ontology created using the W3C Web Ontology Language ("OWL"), as a semantic web language, regardless whether the ontology is open source, publicly-available, private, or proprietary (e.g., an organizationally-specific ontology, such as for use in a corporate entity).

Dataset ingestion controller 120 may be configured to correlate compressed data representation 103 to one or more reference compressed data representations 105a to 105d, etc., to form a correlated compressed data representation. In some examples, "correlating" compressed data representation 103 to one of reference compressed data representations 105 may include comparing and matching compressed data values in view of a relative tolerance or probability indicative of a match filter. For instance, a data value representing compressed data representation 103 may "match" data values of a reference compressed data representation 105 based on a range of values that may define a degree of equivalency. To illustrate, consider column 102 includes a number of zip codes in the state of Texas, whereas a subset of data within graph dataset portion 191 may include a number of zip codes for the entire United States, which may be a superset of data in column 102. Rather than comparing data in each cell 11 to units of data in graph-based data sets 191, 192, 193, and 194 (e.g., at or associated with graph nodes), dataset ingestion controller 120 may be configured to analyze and correlate compressed data representation 103. For example, compressed data representation 103 may be correlated against reference compressed data representations 105 (e.g., associated with a certain match filter) to detect one or more links 121 between column 102 of data. So, compressed data representation 103 (e.g., as a correlated compressed data representation) may be associated with one or more datasets 191, 192, 193, and 194 via reference compressed data representations 105a-105d. According to some examples, each of reference compressed data representations 105a-105d may be disposed in corresponding probabilistic data structures configured to identify a classification type (e.g., an entity class) associated with a probabilistic data structure implemented as a match filter.

In at least some examples, dataset ingestion controller 120 and/or other components of collaborative dataset consolidation system 110 may be configured to implement linked data as one or more canonical datasets with which to modify, query, analyze, visualize, and the like. In some examples, dataset ingestion controller 120 and/or other components of collaborative dataset consolidation system 110 may be configured to form associations between a portion of a graph-based dataset and a table-based dataset (e.g., form associations among graph-based dataset 191 and table-based dataset 130a). For example, format converter 137, which may be disposed in dataset ingestion controller 120, can be configured to form referential data (e.g., IRI data, etc.) to associate a datum (e.g., a unit of data) in a graph data arrangement (e.g., any of graph-based datasets 191 to 194) to a portion of data, such as one of columns 187a to 187d, in a tabular data arrangement (e.g., any of table-based datasets 130a to 130d). Thus, data operations, including dataset enrichment (e.g., joining data to expand datasets) and queries, may be applied against a datum of the tabular data arrangement as the datum in the graph data arrangement. An example of a component of collaborative dataset consolidation system 110 to form associations between a portion of a graph-based dataset and a table-based dataset may be as described in U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS."

As shown, dataset ingestion controller 120 may be configured to identify graph-based datasets that may be transformed or associated with tabular data formats, such as a dataset ("T1") 130a, dataset ("T2") 130b, dataset ("T3") 130c, dataset ("T4") 130d, among others. For example, dataset ingestion controller 120 may form associations via nodes and links (e.g., semantically linked data) to associate each data value 136 in a cell of a tabular data arrangement. Value 136 also may be linked to a row node 134a (of a group ("R") of row nodes 134) and a column node 132a (of a group ("C") of column nodes 132). Node 133 may identify via links to column header data that may be used to classify data (e.g., as zip codes) or identify a datatype (e.g., a string, number, integer, Boolean, etc.), in accordance with some instances. As shown, data in tabular data arrangement 130a may be converted from a graph data arrangement 191, such that data values 136 in table 130a may be mirrored or mapped into graph data arrangement 191. Table 130a may be identified by data representing a table identifier ("ID") 131, whereby data values in each cell of a table format may be linked or otherwise associated with a node in a graph data format.

Further to the example shown, consider that each reference compressed data representation 105a to 105d may be a digital signature in a filter data structure referencing subsets of graph data subsets 191 to 194, respectively, via links 121. A unique digital signature may indicate a unique classification type. In addition, each of subsets of graph data subsets 191 to 194 may be associated via links 123 with a column 187a to 187d, respectively, in corresponding tabular data arrangements 130a to 130d. For example, consider that compressed data representation 103 matches, or correlates to, reference compressed data representation 105d, which in turn, is associated via one of links 123 to graph data 194. Thus, compressed data representation 103 may match data in column 187d, with which associated other data may be related. So, if column 102 includes data of a specific classification type, such as "zip codes of Texas," a correlation between representations 103 and 105d may indicate that graph data portion 194 may include matching zip code data, such as "the zip codes of the United States." Further, dataset ingestion controller 120 may be configured to enrich dataset 101 by adding data in column 187d, which may map to data in graph data portion 194, to dataset 101 to form dataset 101a. Thus, data in column 187d may be added as supplemental data 113 in dataset 101a, based on correlating compressed data representation 103 to reference compressed data representations 105. Or, in some examples, matched data between column 102 and 187d may serve as a point at which to join other data and datasets.

In some cases, dataset ingestion controller 120 may be configured to perform other functionalities with which to form, modify, query and share collaborative datasets according to various examples. In this example, dataset 101a may be disposed in a first data format (e.g., a tabular data arrangement), with which format converter 137 may convert the data into a second data arrangement, such as a graph data arrangement 138. Graph data arrangement 138 may include (e.g., via links) a graph data portion 137a from data in dataset 101 and a graph data portion 137b from data in graph data portion 194. As such, data in a field (e.g., a unit of data in a cell at a row and column) of a table 101 may be disposed in association with a node in a graph 138 (e.g., a unit of data as linked data).

According to some examples, graph dataset portions 191 to 194 may be linkable to each other via links 197, or to other graph data arrangements (not shown). Thus, upon determining a correlation between compressed data representation 103 and a reference compressed data representation 105, then dataset ingestion controller 120 may be configured to link additional datasets for other classification types based on the data in supplemental data 113. For example, if supplemental data 113 includes zip codes, then data in other graph data portions, such as graph data portions 191 to 194, may be "inferred" as being relevant to a correlator compressed data representation. Inferred relevant data may be added as additional supplemental data (not shown). Other graph data portions may include geographic location data (e.g., longitudinal and latitudinal coordinates) associated with a zip code, demographic senses data associated with a zip code, state abbreviation codes associated with a zip code, a county name associated with a zip code, and any other data associated with a zip code classification type (or other associated classification types).

According to some examples, collaborative dataset consolidation system 110 and/or any of its constituent components may implement a software platform composed of multiple programs or scripts (e.g., Java®, JavaScript®, JSON™, Ruby, C+, C++, C#, C, or any other structured or unstructured programming language, structured or unstructured, or the like, including, but not limited to, SQL, SPARQL, TURTLE, etc.) that is configured to parse and analyze "multi-table" data file 101 as multiple datasets to perform a query.

In view of the foregoing, one or more structures and/or one or more functionalities described in FIG. 1 (or anywhere herein) may be configured to expeditiously identify relevant data of an ingested dataset in a first data format, such as a tabular data arrangement 101, with one or more linked datasets disposed in a second data format, such as a graph data arrangement 190. Relevant data may be identified during data ingestion for supplementation with the relevant data, and storage in the graph data arrangement. According to various examples, data in a tabular data arrangement 101 may be matched against data in a graphical data arrangement, which avoids complexities and limitations of relational database architectures. In some examples, reference compressed data representations may be implemented in a corresponding match filter that is configured to receive a compressed data representation for a column of data 102 to determine classification type associated with each match filter. Matched data then may be linked or otherwise joined to any number of datasets in a "corpus" of graph-based datasets. Matching a compressed data representation, as a digital signature, preserves computational resources that otherwise may be used to perform per-cell matching computation rather at a subset (or column) level.

Figure 2:
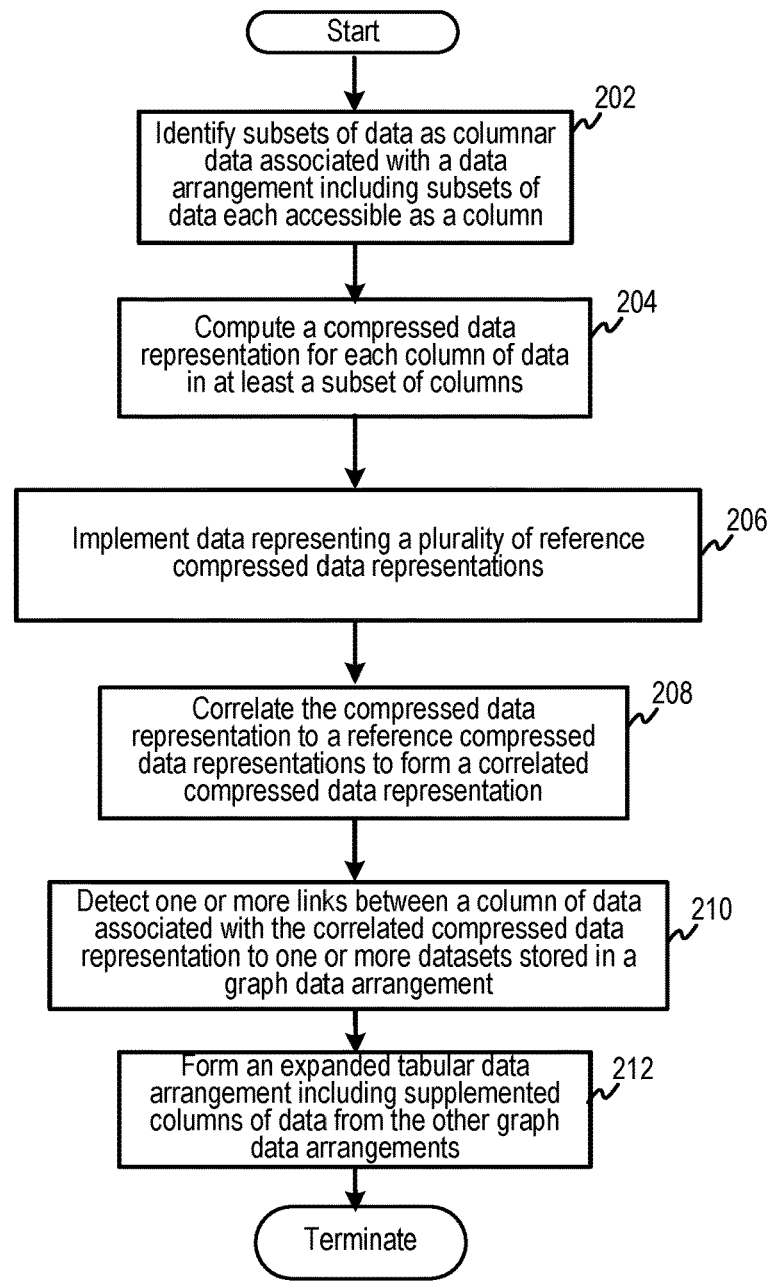
FIG. 2 is a flow diagram depicting an example of identifying relevant data of an ingested dataset with one or more linked datasets, according to some embodiments.

FIG. 2 is a flow diagram depicting an example of identifying relevant data of an ingested dataset with one or more linked datasets, according to some embodiments. In some examples, flow diagram 200 may be implemented in association with a collaborative dataset consolidation system, such as system 110 of FIG. 1. Further, flow diagram 200 may be facilitated via computerized tools including a data project interface, which may be configured to initiate and/or execute instructions to identify data of an ingested dataset, such as a table, that may be relevant with one or more linked datasets stored in a graph-based data arrangement.

At 202, one or more subsets of data associated with a data arrangement may be identified at (or approximate to) ingestion into a computing platform, such as (but not limited to) a collaborative dataset consolidation system. In some examples, a tabular data arrangement may be ingested into the computing platform, whereby subsets of data in the table may constitute columnar data (e.g., data disposed in a column, or otherwise may be associated with links to transform the data into columns for corresponding subsets of data). Further, a compressed data representation for a subset of data (e.g., a column of data) may be computed at 204.

A compressed data representation, as a uniquely compact data value, may be indicative of a classification type to which columnar data may be associated. At 206, data representing a plurality of reference compressed data representations may be implemented (e.g., in a data filter structure). In some examples, subsets of data relating to linked datasets (e.g., semantically-linked datasets) stored in a graph-based data arrangement may be each associated with a compressed data representation, which may be referred to as a reference compressed data representation. A reference compressed data representation may be used to identify whether relevant data of an ingested dataset may be relevant with one or more linked datasets stored in a graph database. In some examples, a compressed data representation and a reference compressed data representation may be derived via one or more hash functions to implement one or more Bloom filters.

At 208, a compressed data representation generated for an ingested dataset may be correlated to one or more reference compressed data representations to form correlated compressed data representation. In at least some examples, a compressed data representation may include a hash value generated by one or more hash functions, and the compressed data representation may be correlated against a data structure (e.g., a probabilistic data structure, such as a Bloom filter) that may be configured to include data representing multiple reference compressed data representations. Comparing the compressed data representation against the data structure may generate a result indicating a likelihood that a value of the compressed data representation may be matched to reference compressed data representation. According to some examples, a compressed data representation may be implemented as a digital signature indicative of the type (e.g., classification type) of data in a subset of data (e.g., a column of data).

At 210, one or more links may be detected between a column of data (e.g., a column of data associated with a correlated compressed data representation) and one or more graph-based datasets stored in a graph data arrangement. Thus, a column of data in a tabular data arrangement may be compared against subsets of data disposed in graph data arrangements to thereby facilitate enrichment of a tabular data arrangement using data stored in graph-based data arrangements (e.g., RDF-based graphs, NoSQL data arrangements, etc.). As graph-based data arrangements may scale effectively in greater sizes, reference compressed data representations of subsets of data in graph-based data arrangements enable a greater amount of datasets to be identified with a tabular column of data for enrichment of an ingested dataset. Note that the one or more links to graph-based datasets may be linkable to other graph data arrangements, thereby enabling further expansion and enrichment of an ingested dataset. At 212, an expanded tabular data arrangement may be enriched by including one or more supplemented columns of data from graph data arrangements that have detected links between a subset of data (associated with a compressed data representation) and other subsets of data (associated with at least a subset of correlatable compressed data representations).

Figure 3:
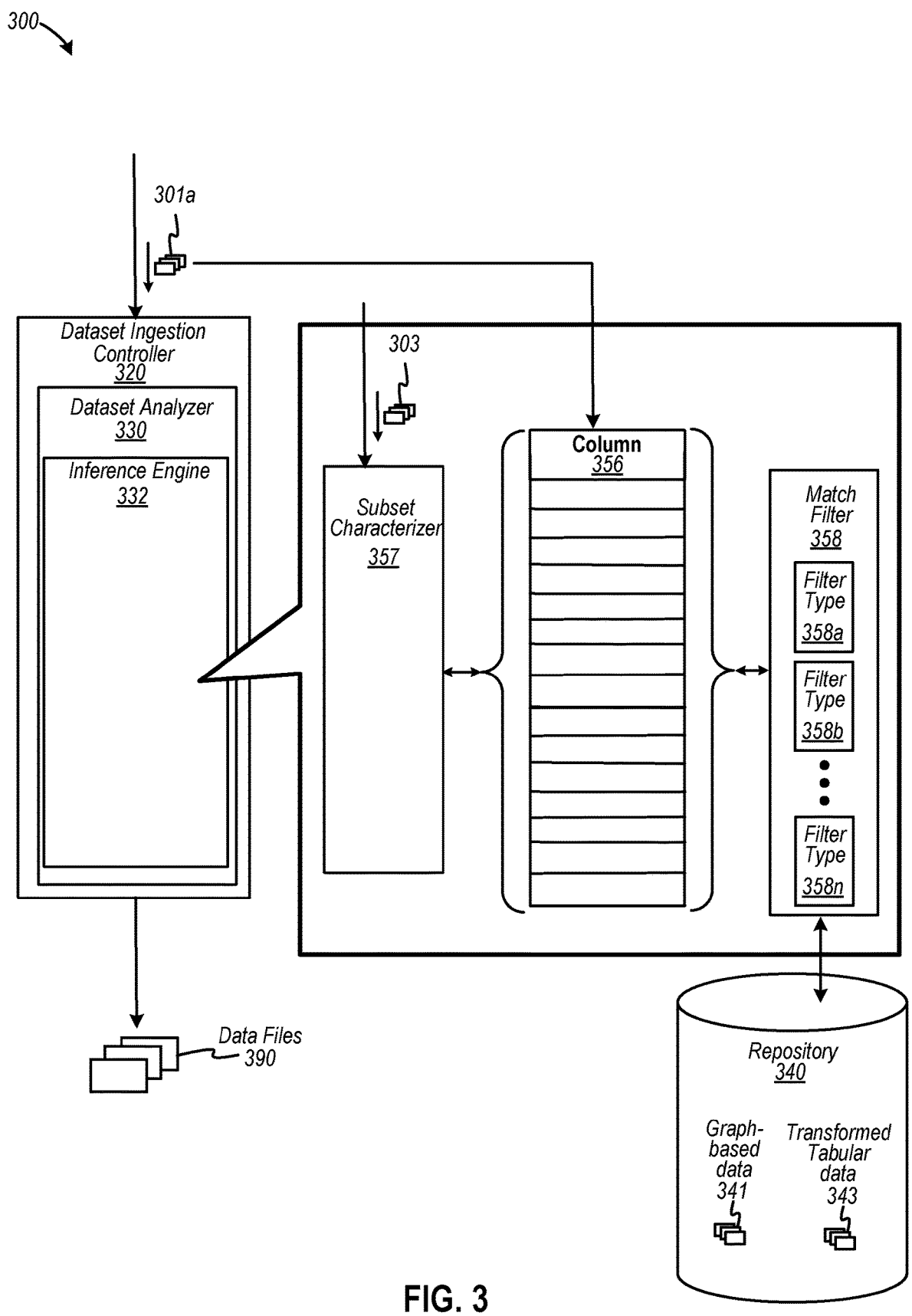
FIG. 3 is a diagram depicting a dataset ingestion controller configured to determine a classification of an arrangement of data for matching with other datasets, according to some examples.

FIG. 3 is a diagram depicting a dataset ingestion controller configured to determine a classification of an arrangement of data for matching with other datasets, according to some examples. Diagram 300 depicts a dataset ingestion controller 320 including a dataset analyzer 330 and an inference engine 332. Further, inference engine 332 may be configured to further include a subset characterizer 357 and a match filter 358, either or both of which may be implemented. According to various examples, subset characterizer 357 and match filter 358 each may be configured to classify units of data in, for example, a column 356 of ingested data 301a to determine one or more of a classification type, a datatype, a categorical variable, or any dataset attribute associated with column 356, which be equivalent to column 102 of tabular dataset 101 of FIG. 1. In one or more implementations, elements depicted in diagram 300 of FIG. 3 may include structures and/or functions as similarly-named or similarly-numbered elements depicted in other drawings. Examples of similar or equivalent structures and/or functionalities of a dataset analyzer and an inference engine as described in U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS."

Subset characterizer 357 may be configured to characterize subsets of data and form a reduced data representation of a characterized subset of data. Subset characterizer 357 may be further configured to receive data 303 indicating a category type of interest to focus matching to a subset of portions of match filter 358, thereby preserving resources. In operation, subset characterizer 357 may receive data 303 as input data generated from a graphical user interface.

Match filter 358 may include any number of filter types 358a, 358b, and 358n, each of which may be configured to receive a stream of data representing a column 356 of data. A filter type, such as filter types 358a, 358b, and 358n, may be configured to compute one or more states indicative of whether there is a match to identify a categorical variable. In at least some examples, filter types 358a, 358b, and 358n are implemented as probabilistic filters (e.g., Bloom filters) each configured to determine whether a subset of data is either "likely" or "definitely not" in a set of data. Likely subsets of data may be included in data files 390. In some examples, a stream of data representing a column 356 may be processed to compress subsets of data (e.g., via hashing) to apply to each of filter types 358a, 358b, and 358n. For example, filter types 358a, 358b, and 358n may be predetermined (e.g., prefilled as Bloom filters) for classification types or entity classes of interest. A stream of data representing a column 356, or compressed representations thereof (e.g., hash signatures), may be applied to one or more Bloom filters to compare against categorical data.

In one example, consider that as Bloom filters 358a, 358b, and 358n may be generated by analyzing graph-based data 341 (e.g., graph data arrangements 190 in FIG. 1) and transform tabular data 343 (e.g., tabular data arrangements 130a to 130d in FIG. 1), both of which may be stored in repository 340. For example, consider that Bloom filter 358a is formed to identify an entity class (or classification type) of "zip codes." To build filter 358a, subsets of zip codes in graph data arrangement 190 and/or tabular data arrangements 130a to 130d of FIG. 1 may be applied to "m" number of hash functions, such as a murmur hash function or any known hash function (e.g., 2x+9 mod 5, 3x+3 mod 2, etc.), to form a probabilistic data structure. The "m" number of hash functions may be applied to data in column 356 to form a compressed data representation of the data therein. Then, inference engine 332 and/or dataset ingestion controller 320 may be configured to apply the compressed data representation of column 356, which if it includes zip codes, may substantially match data in Bloom filter 358a. If a threshold value is met, then a determination may be made that data in column 356 may be similar or equivalent to data in repository 340, which was used to create or generate Bloom filter 358a. A threshold may specify a confidence level of 97%, which may indicate filter results based on compressed data representation of column 356, and portions thereof, match contents of Bloom filter 358a.

Consider an event in which column 356 includes 98% of data that matches a category "state abbreviations." Perhaps column 356 includes a typographical error or a U.S. territory, such as the U.S. Virgin Islands or Puerto Rico, which are not states but nonetheless have postal abbreviations. In some examples, inference engine 332 may be configured to infer a correction for typographical error. For example, if a state abbreviation for Alaska is "AK," and an instance of "KA" is detected in column 356, inference engine 332 may predict a transposition error and corrective action to resolve the anomaly. Dataset analyzer 330 may be configured to generate a notification to present in a user interface that may alert a user that less than 100% of the data matches the category "state abbreviations," and may further present the predicted remediation action, such as replacing "KA" with "AK," should the user so select. Or, such remedial action may be implemented automatically if a confidence level is sufficient enough (e.g., 99.8%) that the replacement of "KA" with "AK" resolves the anomalous condition. In view of the foregoing, inference engine 332 may be configured to automatically determine categorical variables (e.g., classifications of data) when ingesting, for example, data and matching against, for example, 50 to 500 categories, or greater.

Figure 4:
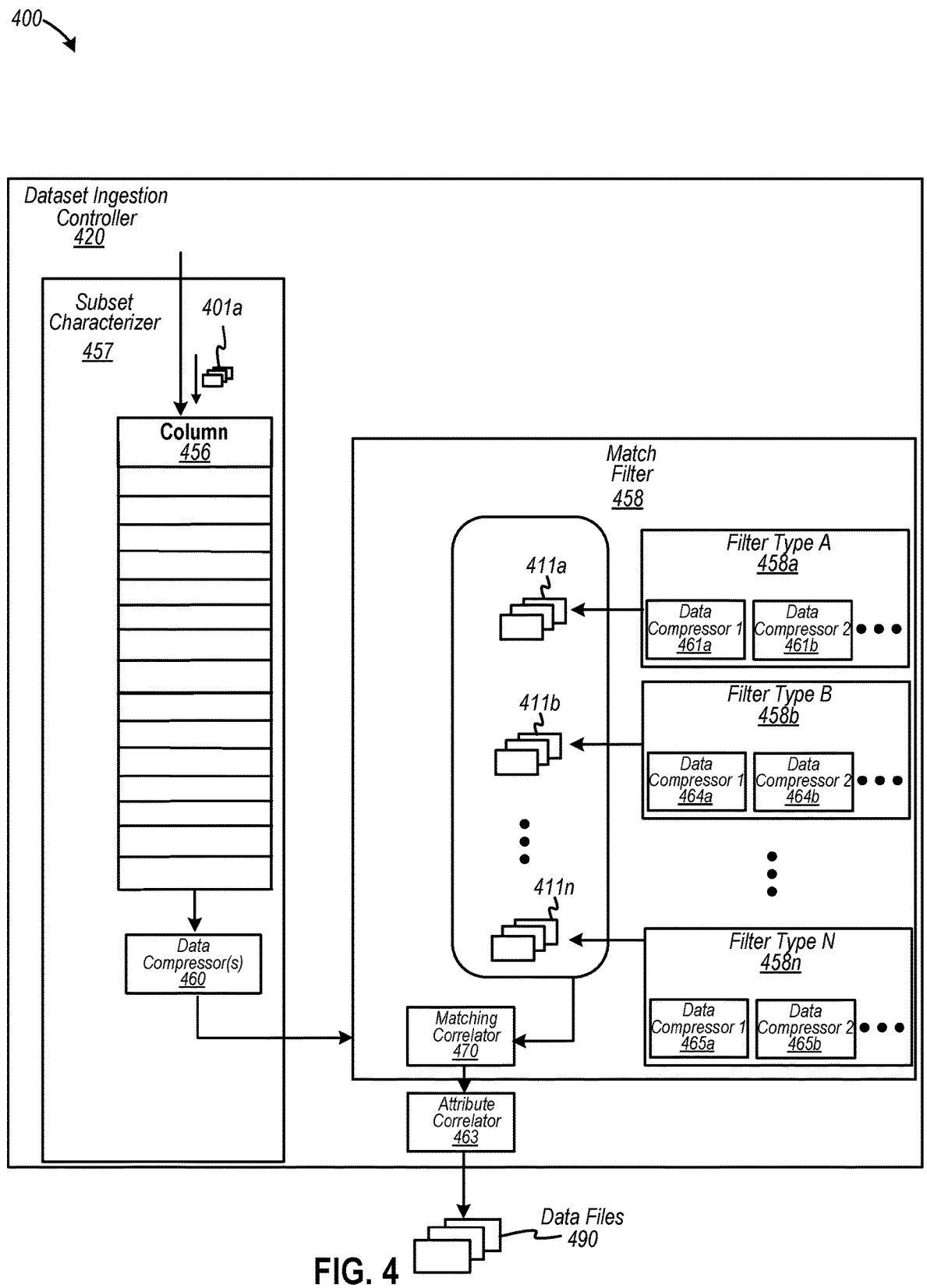
FIG. 4 is a diagram depicting another example of a dataset ingestion controller configured to determine a classification of an arrangement of data for matching with other datasets, according to some examples.

FIG. 4 is a diagram depicting a dataset ingestion controller configured to determine a classification of an arrangement of data for matching with other datasets, according to some examples. Diagram 400 depicts a dataset ingestion controller 420 including a subset characterizer 457, one or more data compressors 460, a match filter 458, and an attribute correlator 463. Similar to diagram 300 of FIG. 3, subset characterizer 457 and match filter 458 each may be configured to classify units of data in, for example, a column 456 of ingested data 401a to determine type of entity class, or the like. In one or more implementations, elements depicted in diagram 400 of FIG. 4 may include structures and/or functions as similarly-named or similarly-numbered elements depicted in other drawings.

In this example, one or more data compressors 460 may include one or more sets of hash functions for application in association with match filter 458, which includes modified Bloom filters 458a, 458b, and 458n. Each of modified Bloom filters 458a, 458b, and 458n may be configured to determine whether one or more compressed data representations generated by data compressors 460 match datasets associated with the respective probabilistic data structures of 458a, 458b, and 458n, which can generate respective filter results 411a to 411c. For example, filter type ("A") 458a may be configured to detect zip codes and filter type ("B") 458b may be configured to detect fish names in accordance with the zoological taxonomy. In at least some examples, modified Bloom filters 458a, 458b, and 458n may be hierarchical Bloom filters that include additional data compressors 461a, 461b, . . . , 464a, 464b, . . . , and 465a, 465b, . . . to implement sub-level Bloom filters. The sub-level Bloom filters may be configured to granularly match compressed data representations and provide implicit information based on results of matching a compressed data representation against reference compressed data representations derived by the sub-level Bloom filters.

To illustrate, consider further the above example in which filter type 458a is configured to detect zip codes within the United States. If a column 456 includes zip codes limited to a U.S. territory, such as Puerto Rico, then a compressed data representation thereof may have little to no overlap with a dataset of U.S. zip codes (e.g., limited to 50 states). So, data compressors 461a, 461b, . . . , may be used to generate Bloom filters targeted to each of 50 states as well as each of the U.S. territories. Thus, a compressed data representation derived from column 456 of Puerto Rico zip codes may have a relatively thorough or stronger correlatable filter result 411a should a sub-level Bloom filter be directed to detecting Puerto Rican zip codes. In some examples, likely subsets of data, as determined by one or more Bloom filters, may be included in data files 390.

Additionally, matching correlator 470 may be able to analyze a combination of sub-level Bloom filter results to apply heuristics and/or rules to predict a type of entity class based on multiple sub-level Bloom filters. For example, sub-level Bloom filter may be configured to match zip codes associated with historic hurricane events, which may include coastal zip codes in Puerto Rico (e.g., coastal regions most affected by natural disasters). By finding a relatively high correlatable filter match, attribute correlator 463 can predict that additional data may be inferred, such as costs of natural disasters, demographic data (e.g., via census data), and the like. Similarly, if filter type 458b may be configured to detect fish names, then sub-level Bloom filters may be configured to detect names of fish species by location and either fresh or salt water. If data in column 456 includes fish names that are associated with a compressed data representation that is relatively correlatable to a sub-level Bloom filter configured to identify fish names in Lake Michigan, then attribute correlator 463 may predict that the dataset from which column 456 originates may be inferred to be directed to one or more locations in Michigan, Wisconsin, Illinois, and Indiana. Thus, datasets associated with these locations or containing state codes MI, WI, IL, and IN may be relevant to adding as supplemental data in accordance with various examples. In various examples, attribute correlator 463 may be configured to correlate "inferred" or "implicit" attributes with a dataset to other attributes, which may be implemented to join supplemental data to enrich an ingested dataset.

Figure 5:
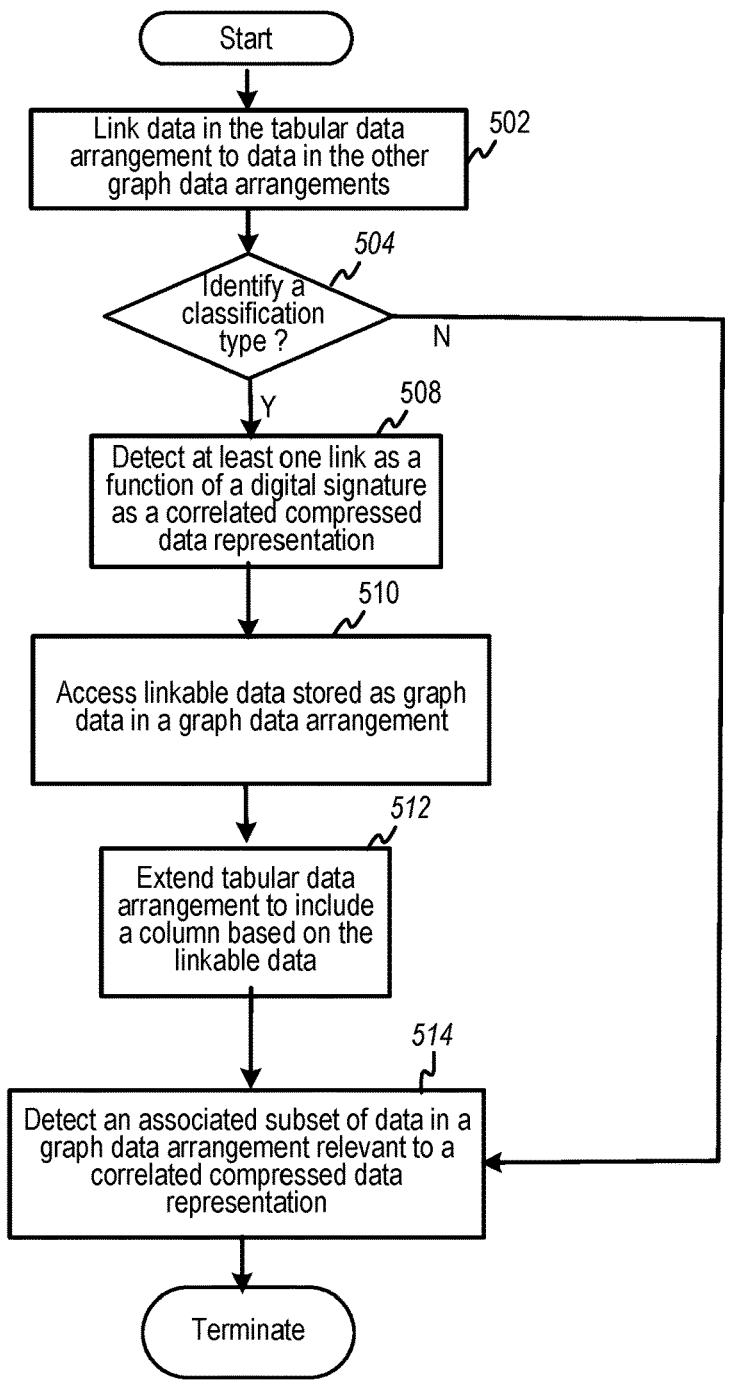
FIG. 5 is a flow diagram depicting another example of identifying relevant data of an ingested dataset with one or more linked datasets, according to some embodiments.

FIG. 5 is a flow diagram depicting another example of identifying relevant data of an ingested dataset with one or more linked datasets, according to some embodiments. In some examples, flow diagram 500 may be implemented in association with a collaborative dataset consolidation system, such as system 110 of FIG. 1. Further, flow diagram 500 may be facilitated via computerized tools including a data project interface, which may be configured to initiate and/or execute instructions to identify data of an ingested dataset, such as a table, that may be relevant with one or more linked datasets stored in a graph-based data arrangement.

At 502, data in a tabular data arrangement may be linked data and other graph data arrangement responsive to determining a correlation (e.g., a match) between a compressed data representation associated with a column of a table and at least one reference compressed data representation associated with a subset of data disposed in a graph data arrangement. Upon matching a compressed data representation of a column of data (e.g., from a table of data) to a configured Bloom filter, a classification type associated with the Bloom filter may identify a classification at 504.

At 508, at least one link may be detected as a function of a digital signature indicative of a correlated compressed data representation. For example, a compressed data representation that matches a reference compressed representation in a match filter (e.g., in a Bloom filter) may be referred to as a correlated compressed data representation. At 510, linkable data stored as graph data may be accessed from a graph data arrangement based on a detected link at 508. In some examples, linkable data stored in a graph may be relevant to data ingested in association with a column of a table. As such, a tabular data arrangement may be extended to include supplemental data as a column (e.g., a supplemental column) based on the linkable data. An example of such a column may be supplemental data 113 of FIG. 1.

A subset of data in a graph data arrangement, such as supplemental data retrieved responsive to identifying a correlated compressed data representation, may be determined to be relevant to a correlated compressed data representation. For example, a column of data in an ingested table may relate to zip codes, and supplemental data may be identified in graph data (e.g., based on correlating a compressed data representation for the zip codes to reference compressed data representation stored in a Bloom filter). Further, additional data may be joinable based on joining the supplemental data to data form the ingested table. In this case, an associated subset of data in a graph may be detected as being relevant for inclusion as additional supplemental data at 514. For example, a subset of data including county names in a graph data may be linked as additional supplemental data to the data from the ingested table.

Figure 6:
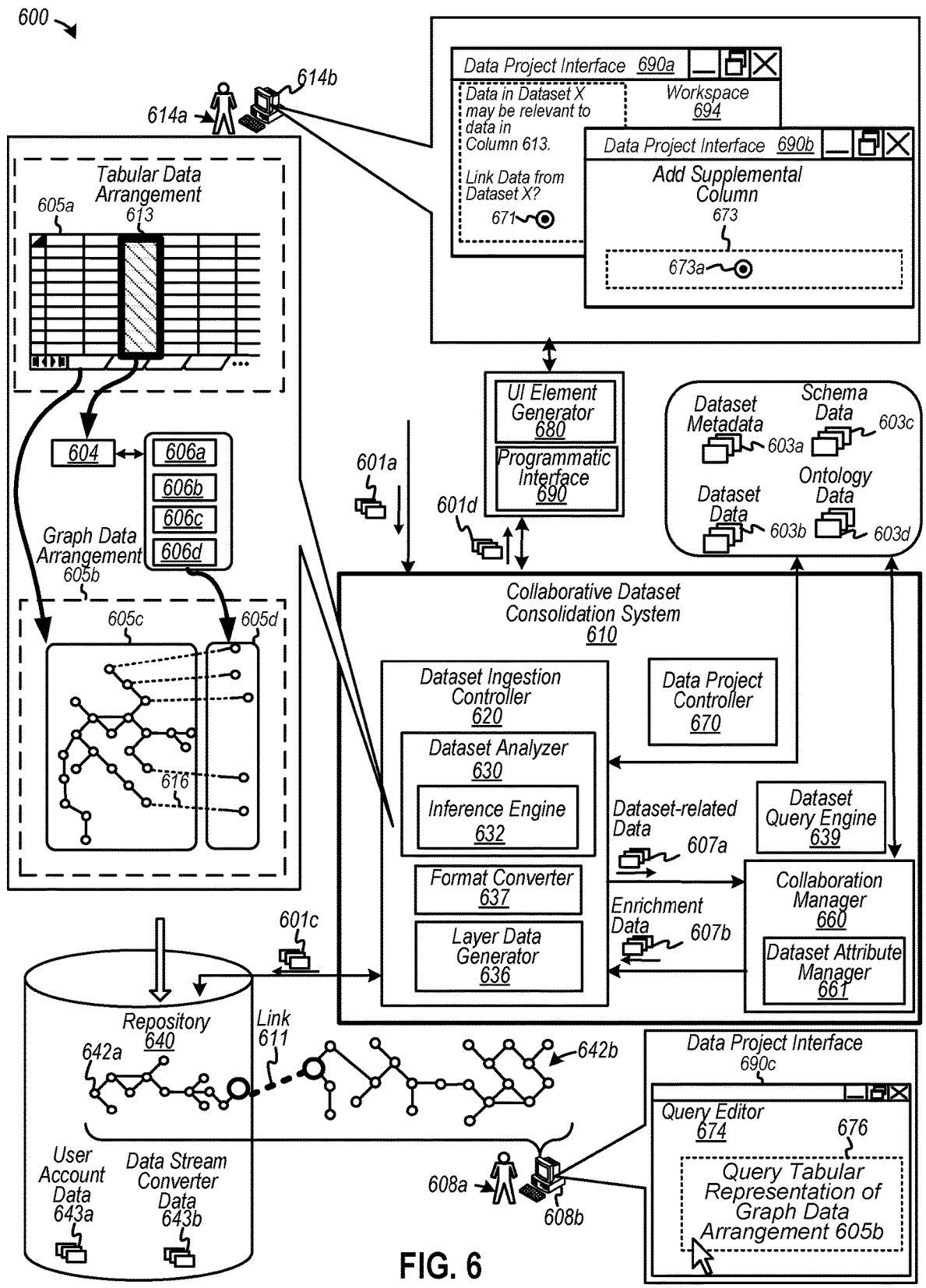
FIG. 6 is a diagram depicting an example of a data ingestion controller configured to identify relevant data of an ingested dataset with one or more linked datasets, according to some embodiments.

FIG. 6 is a diagram depicting an example of a data ingestion controller configured to identify relevant data of an ingested dataset with one or more linked datasets, according to some embodiments. Diagram 600 depicts an example of a collaborative dataset consolidation system 610 that may be configured to consolidate one or more datasets to form collaborative datasets as, for example, a canonical dataset. A collaborative dataset, according to some non-limiting examples, is a set of data that may be configured to facilitate data interoperability over disparate computing system platforms, architectures, and data storage devices. Further, a collaborative dataset may also be associated with data configured to establish one or more associations (e.g., metadata) among subsets of dataset attribute data for datasets and multiple layers of layered data, whereby attribute data may be used to determine correlations (e.g., data patterns, trends, etc.) among the collaborative datasets.

In some examples, data project controller 670 may be configured to control creation and evolution of a data project for managing collaborative datasets. Also, data project controller 670 may also initiate importation (e.g., ingestion) of dataset 605a via dataset ingestion controller 620. Implementation of data project controller 670 to access, modify, or improve a data project may be activated via a user account associated with a computing device 614b (and/or user 614a). Data representing the user account may be disposed in repository 640 as user account data 643a. In this example, computing device 614b and user 614a may each be identified as a creator or "owner" of a dataset and/or a data project. However, initiation of data project controller 670 to access, modify, or improve a data project may originate via another user account associated with a computing device 608b (and/or user 608a), who, as a collaborator, may access datasets, queries, and other data associated with a data project to perform additional analysis and information augmentation. In some examples, a collaborative computing device 608b may be configured to access a dataset derived as a function of matching or correlating a compressed data representation of column 613 of table 605a to one or more Bloom filters, as described herein.

Collaborative dataset consolidation system 610 may be configured to generate data for presentation in a display to form computerized tools in association with data project interface 690*a*, which is shown in this example to include an interface portion including a user input 671 to link a dataset identified by matching a compressed data representation 604 (for data in column 613) to one or more reference compressed data representations 606*a* to 606*d* integrated into, for example, respective Bloom filters (not shown). Further, data project interface 690*a* also may present an interactive workspace interface portion 694. Consider that computing device 614*b* may be configured to initiate importation of a dataset 605*a* (e.g., in a tabular data arrangement) for conversion into a data project as a dataset 605*b* (e.g., in a graph data arrangement). Data project interface 690*b* may be an interface portion configured to provide a user input 673*a* to add data as a supplemental column 673 to enrich data in dataset 605*a*.

Dataset 605*a* may be ingested as data 601*a*, which may be received in the following examples of data formats: CSV, XML, JSON, XLS, MySQL, binary, free-form, unstructured data formats (e.g., data extracted from a PDF file using optical character recognition), etc., among others. Consider further that dataset ingestion controller 620 may receive data 601*a* representing a dataset 605*a*, which may be formatted as a "spreadsheet data file" that may include multiple tables associated with each tab of a spreadsheet, according to some examples. Dataset ingestion controller 620 may arrange data in dataset 605*a* into a first data arrangement, or may identify that data in dataset 605*a* is formatted in a particular data arrangement, such as in a first data arrangement. In this example, dataset 605*a* may be disposed in a tabular data arrangement that format converter 637 may convert into a second data arrangement, such as a graph data arrangement 605*b*. As such, data in a field (e.g., a unit of data in a cell at a row and column) of a table 605*a* may be disposed in association with a node in a graph 605*b* (e.g., a unit of data as linked data). A data operation (e.g., a query) may be applied as either a query against a tabular data arrangement (e.g., based on a relational data model) or graph data arrangement (e.g., based on a graph data model, such as using RDF). Since equivalent data are disposed in both a field of a table and a node of a graph, either the table or the graph may be used interchangeably to enrich or supplement an ingested dataset, as well as to perform queries and other data operations. Similarly, a dataset disposed in one or more other graph data arrangements may be disposed or otherwise mapped (e.g., linked) as a dataset into a tabular data arrangement.

Collaborative dataset consolidation system 610 is shown in this example to include a dataset ingestion controller 620, a collaboration manager 660 including a dataset attribute manager 661, a dataset query engine 639 configured to manage queries, and a data project controller 670. Dataset ingestion controller 620 may be configured to ingest and convert datasets, such as dataset 605*a* (e.g., a tabular data arrangement) into another data format, such as into a graph data arrangement 605*b*. Collaboration manager 660 may be configured to monitor updates to dataset attributes and other changes to a data project, and to disseminate the updates to a community of networked users or participants. Therefore, users 614*a* and 608*a*, as well as any other user or authorized participant, may receive communications, such as in an interactive collaborative activity feed (not shown) to discover new or recently-modified dataset-related information in real-time (or near real-time). Thus, collaboration manager 660 and/or other portions of collaborative dataset consolidation system 610 may provide collaborative data and logic layers to implement a "social network" for datasets. Dataset attribute manager 661 may include logic configured to detect patterns in datasets, among other sources of data, whereby the patterns may be used to identify or correlate a subset of relevant datasets that may be linked or aggregated with a dataset. Linked datasets may form a collaborative dataset that may be enriched with supplemental information from other datasets. Dataset query engine 639 may be configured to receive a query to apply against a one or more datasets, which may include at least graph data arrangement 605*b*. In some examples, a query may be implemented as either a relational-based query (e.g., in an SQL-equivalent query language) or a graph-based query (e.g., in a SPARQL-equivalent query language), or a combination thereof. Further, a query may be implemented as either an implicit federated query or an explicit federated query.

According to some embodiments, a data project may be implemented as an augmented dataset as graph data arrangement 605*b*, which may include supplemental data associated with a matched reference compressed data representations 606*a* to 606*d*. Graph data 605*d* associated with a matched reference compressed data representation may be linked or associated, via links 616, to graph data 605*c*, which may be converted from table data arrangement 605*a*. In some examples, graph data arrangement 605*b* may be disposed in repository 640 as a graph-based dataset 642*a*, which, in turn, may be linked via link 611 to externally-accessible dataset 642*b*, which may be owned, created, and/or controlled by computing device 608*b*. In at least one example, a collaborative user 608*a* may access via a computing device 608*b* a data project interface 690*c* in which computing device 608*b* may activate a user input 676 to include access one or more portions of dataset 642*a*, which may include graph data arrangement 605*b*, or portions thereof, such a graph data portion 605*c* and graph data portion 605*d*.

Note that in some examples, an supplemental data or information may include, at least in some examples, information that may automatically convey (e.g., visually in text and/or graphics) dataset attributes of a created dataset or analysis of a query, including dataset attributes and derived dataset attributes, during or after (e.g., shortly thereafter) the creation or querying of a dataset. In some examples, supplemental data or information may be presented as dataset attributes in a user interface (e.g., responsive to dataset creation) may describe various aspects of a dataset, such as dataset attributes, in summary form, such as, but not limited to, annotations (e.g., metadata or descriptors describing columns, cells, or any portion of data), data classifications (e.g., a geographical location, such as a zip code, etc., or any descriptive data specifying a classification type or entity class), datatypes (e.g., string, numeric, categorical, boolean, integer, etc.), a number of data points, a number of columns, a "shape" or distribution of data and/or data values, a number of empty or non-empty cells in a tabular data structure, a number of non-conforming data (e.g., a non-numeric data value in column expecting a numeric data, an image file, etc.) in cells of a tabular data structure, a number of distinct values, as well as other dataset attributes.

Dataset analyzer 630 may be configured to analyze data file 601*a*, as an ingested dataset 605*a*, to detect and resolve data entry exceptions (e.g., whether a cell is empty or includes non-useful data, whether a cell includes non-conforming data, such as a string in a column that otherwise includes numbers, whether an image embedded in a cell of a tabular file, whether there are any missing annotations or column headers, etc.). Dataset analyzer 630 then may be configured to correct or otherwise compensate for such exceptions. Dataset analyzer 630 also may be configured to classify subsets of data (e.g., each subset of data as a column of data) in data file 601a representing tabular data arrangement 605a as a particular data classification, such as a particular data type or classification. For example, a column of integers may be classified as "year data," if the integers are formatted similarly as a number of year formats expressed in accordance with a Gregorian calendar schema. Thus, "year data" may be formed as a derived dataset attribute for the particular column. As another example, if a column includes a number of cells that each includes five digits, dataset analyzer 630 also may be configured to classify the digits as constituting a "zip code." According to some examples, dataset analyzer 630 may be configured to classify data as classification type or entity class based on detecting a match or correlation between a compressed data representation 604 and at least one of probabilistic data structures 606a to 606d.

In some examples, an inference engine 632 of dataset analyzer 630 can be configured to analyze data file 601a to determine correlations among dataset attributes of data file 601a and other datasets 642b (and dataset attributes, such as metadata 603a). Once a subset of correlations has been determined, a dataset formatted in data file 601a (e.g., as an annotated tabular data file, or as a CSV file) may be enriched, for example, by associating links between tabular data arrangement 605a and other datasets (e.g., by joining with, or linking to, other datasets) to extend the data beyond that which is in data file 601a. In one example, inference engine 632 may analyze a column of data to infer or derive a data classification for the data in the column. In some examples, a datatype, a data classification, etc., as well any dataset attribute, may be derived based on known data or information (e.g., annotations), or based on predictive inferences using patterns in data.

Further to diagram 600, format converter 637 may be configured to convert dataset 605a into another format, such as a graph data arrangement 642a, which may be transmitted as data 601c for storage in data repository 640. Graph data arrangement 642a in diagram 600 may be linkable (e.g., via links 611) to other graph data arrangements to form a collaborative dataset. Also, format converter 637 may be configured to generate ancillary data or descriptor data (e.g., metadata) that describe attributes associated with each unit of data in dataset 605a. The ancillary or descriptor data can include data elements describing attributes of a unit of data, such as, for example, a label or annotation (e.g., header name) for a column, an index or column number, a data type associated with the data in a column, etc. In some examples, a unit of data may refer to data disposed at a particular row and column of a tabular arrangement (e.g., originating from a cell in dataset 605a). In some cases, ancillary or descriptor data may be used by inference engine 632 to determine whether data may be classified into a certain classification, such as where a column of data includes "zip codes." In some examples, this classification may be based on matching compressed data representation 603 to a particular data in a Bloom filter.

Layer data generator 636 may be configured to form linkage relationships of ancillary data or descriptor data to data in the form of "layers" or "layer data files." Implementations of layer data files may facilitate the use of supplemental data (e.g., derived or added data, etc.) that can be linked to an original source dataset, whereby original or subsequent data may be preserved. As such, format converter 637 may be configured to form referential data (e.g., IRI data, etc.) to associate a datum (e.g., a unit of data) in a graph data arrangement to a portion of data in a tabular data arrangement. Thus, data operations, such as a query, may be applied against a datum of the tabular data arrangement as the datum in the graph data arrangement. An example of a layer data generator 636, as well as other components of collaborative dataset consolidation system 610, may be as described in U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS."

According to some embodiments, a collaborative data format may be configured to, but need not be required to, format converted dataset 605a into an atomized dataset. An atomized dataset may include a data arrangement in which data is stored as an atomized data point that, for example, may be an irreducible or simplest data representation (e.g., a triple is a smallest irreducible representation for a binary relationship between two data units) that are linkable to other atomized data points, according to some embodiments. As atomized data points may be linked to each other, data arrangement 642a may be represented as a graph, whereby converted dataset 605a (i.e., atomized dataset 605b) may form a portion of a graph. In some cases, an atomized dataset facilitates merging of data irrespective of whether, for example, schemas or applications differ. Further, an atomized data point may represent a triple or any portion thereof (e.g., any data unit representing one of a subject, a predicate, or an object), according to at least some examples.

As further shown, collaborative dataset consolidation system 610 may include a dataset attribute manager 661. Dataset ingestion controller 620 and dataset attribute manager 661 may be communicatively coupled to dataset ingestion controller 620 to exchange dataset-related data 607a and enrichment data 607b, both of which may exchange data from a number of sources (e.g., external data sources) that may include dataset metadata 603a (e.g., descriptor data or information specifying dataset attributes), dataset data 603b (e.g., some or all data stored in system repositories 640, which may store graph data), schema data 603c (e.g., sources, such as schema.org, that may provide various types and vocabularies), ontology data 603d from any suitable ontology and any other suitable types of data sources. Ontology data 603d may include proprietary data unique to a certain organization and may be secured to prevent public access. One or more elements depicted in diagram 600 of FIG. 6 may include structures and/or functions as similarly-named or similarly-numbered elements depicted in other drawings, or as otherwise described herein, in accordance with one or more examples. Dataset attribute manager 661 may be configured to monitor changes in dataset data and/or attributes, including user account attributes. As such, dataset attribute manager 660 may monitor dataset attribute changes, such as a change in number or identity of users sharing a dataset, as well as whether a dataset has been created, modified, linked, updated, associated with a comment, associated with a request, queried, or has been associated with any other dataset interactions. Dataset attribute manager 661 may also monitor and correlate data among any number of datasets, some other examples of dataset attributes.

In the example shown if FIG. 6, dataset ingestion controller 620 may be communicatively coupled to a user interface, such as data project interface 690a, via one or both of a user interface ("UI") element generator 680 and a programmatic interface 690 to exchange data and/or commands (e.g., executable instructions) for facilitating data project modification to include dataset 605a. UI element generator 680 may be configured to generate data representing UI elements to facilitate the generation of data project interfaces 690a and 690b and graphical elements thereon. For example, UI generator 680 may cause generation UI elements, such as a container window (e.g., icon to invoke storage, such as a file), a browser window, a child window (e.g., a pop-up window), a menu bar (e.g., a pull-down menu), a context menu (e.g., responsive to hovering a cursor over a UI location), graphical control elements (e.g., user input buttons, check boxes, radio buttons, sliders, etc.), and other control-related user input or output UI elements. In some examples, a data project interface, such as data project interface 690a or data project interface 690b, may be implemented as, for example, a unitary interface window in which multiple user inputs may provide access to numerous aspects of forming or managing a data project, according to a non-limiting example.

Programmatic interface 690 may include logic configured to interface collaborative dataset consolidation system 610 and any computing device configured to present data ingestion interface 602 via, for example, any network, such as the Internet. In one example, programmatic interface 690 may be implemented to include an applications programming interface ("API") (e.g., a REST API, etc.) configured to use, for example, HTTP protocols (or any other protocols) to facilitate electronic communication. In one example, programmatic interface 690 may include a web data connector, and, in some examples, may include executable instructions to facilitate data exchange with, for example, a third-party external data analysis computerized tool. A web connector may include data stream converter data 643b, which, for example, may include HTML code to couple a user interface 690a with an external computing device. Examples of external applications and/or programming languages to perform external statistical and data analysis include "R," which is maintained and controlled by "The R Foundation for Statistical Computing" at www(dot)r-project(dot)org, as well as other like languages or packages, including applications that may be integrated with R (e.g., such as MATLAB™, Mathematica™, etc.). Or, other applications, such as Python programming applications, MATLAB™, Tableau® application, etc., may be used to perform further analysis, including visualization or other queries and data manipulation.

According to some examples, user interface ("UI") element generator 680 and a programmatic interface 690 may be implemented in association with collaborative dataset consolidation system 610, in a computing device associated with data project interfaces 690a and 690b, or a combination thereof. UI element generator 680 and/or programmatic interface 690 may be referred to as computerized tools, or may facilitate presentation of data 601d to form data project interface 690a, or the like, as a computerized tool, according to some examples.

In at least one example, additional datasets to enhance dataset 642a may be determined through collaborative activity, such as identifying that a particular dataset may be relevant to dataset 642a based on electronic social interactions among datasets and users. For example, data representations of other relevant dataset to which links may be formed may be made available via an interactive collaborative dataset activity feed. An interactive collaborative dataset activity feed may include data representing a number of queries associated with a dataset, a number of dataset versions, identities of users (or associated user identifiers) who have analyzed a dataset, a number of user comments related to a dataset, the types of comments, etc.). Thus, dataset 642a may be enhanced via "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets." In one example, collaborative dataset consolidation system 610 may be configured to detect a link to supplemental data in a portion of dataset 642b, which may be associated with a user account (e.g., described in user account data 643a) and managed by computing device 608b. Further, collaborative dataset consolidation system 610 may generate a notification via network to transmit to computing device 608b so that user 608a may be informed, via a dataset activity feed, that activity has occurred with one of its datasets. Hence, collaboration may ensue.

According to various embodiments, one or more structural and/or functional elements described in FIG. 6 or herein may be implemented in hardware or software, or both. Examples of one or more structural and/or functional elements described herein may be implemented as set forth in one or more of U.S. patent application Ser. No. 15/186,514, filed on Jun. 19, 2016, and titled "COLLABORATIVE DATASET CONSOLIDATION VIA DISTRIBUTED COMPUTER NETWORKS," U.S. patent application Ser. No. 15/186,517, filed on Jun. 19, 2016, and titled "QUERY GENERATION FOR COLLABORATIVE DATASETS," and U.S. patent application Ser. No. 15/454,923, filed on Mar. 9, 2017, and titled "COMPUTERIZED TOOLS TO DISCOVER, FORM, AND ANALYZE DATASET INTERRELATIONS AMONG A SYSTEM OF NETWORKED COLLABORATIVE DATASETS," each of which is herein incorporated by reference.

Figure 7:
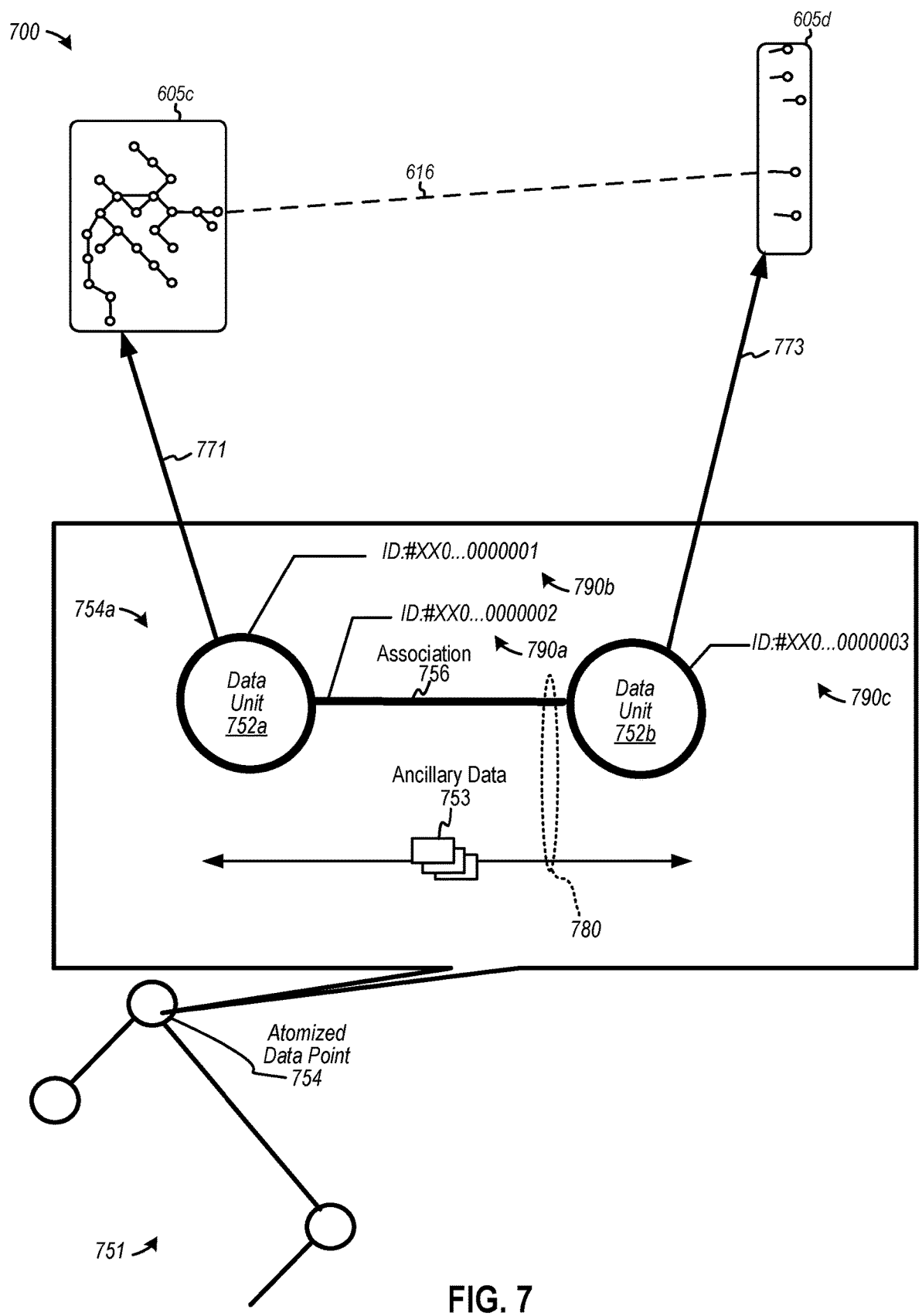
FIG. 7 is a diagram depicting an example of an atomized data point, according to some embodiments.

FIG. 7 is a diagram depicting an example of an atomized data point, according to some embodiments. In some examples, an atomized dataset may be formed by converting a tabular data format into a format associated with the atomized dataset. In some cases, portion 751 of an atomized dataset can describe a portion of a graph that includes one or more subsets of linked data. Further to diagram 700, one example of atomized data point 754 is shown as a data representation 754a, which may be represented by data representing two data units 752a and 752b (e.g., objects) that may be associated via data representing an association 756 with each other. One or more elements of data representation 754a may be configured to be individually and uniquely identifiable (e.g., addressable), either locally or globally in a namespace of any size. For example, elements of data representation 754a may be identified by identifier data 790a, 790b, and 790c (e.g., URIs, URLs, IRIs, etc.).

Diagram 700 depicts a portion 751 of an atomized dataset that includes an atomized data point 754a, which includes links formed to facilitate identifying relevant data of an ingested dataset with one or more linked datasets, according to some examples. In this example, atomized data point 754a an (e.g., join) supplemental data to a dataset responsive to detecting a match between compressed data representations and one or more match filters (e.g., one or more Bloom filters). The data representing the identifiers may be disposed within a corresponding graph data arrangement based on a graph data model. In diagram 700, graph data portion 605c of FIG. 6 may be linked via link 771 to node 752a, which, in turn, may be linked from node 752b via link 773 to graph data portion 605d of FIG. 6, which may be a remote or external dataset. Any of links 771 and 773 may be removed if a corresponding dataset identifier is disassociated from a data project. In some examples, removal of one of links 771 and 773 may generate a new version of a data project, whereby the removed link may be preserved for at least archival purposes. Note, too, that while a first entity (e.g., a dataset owner) may exert control and privileges over portion 751 of an atomized dataset that includes atomized data point 754, a collaborator-user or a collaborator-computing device may form any of links 771 and 773. In one example, data units 752a and 752b may represent any of nodes depicted in 605b in FIG. 6, according to at least one implementation.

In some embodiments, atomized data point 754a may be associated with ancillary data 753 to implement one or more ancillary data functions. For example, consider that association 756 spans over a boundary between an internal dataset, which may include data unit 752a, and an external dataset (e.g., external to a collaboration dataset consolidation), which may include data unit 752b. Ancillary data 753 may interrelate via relationship 780 with one or more elements of atomized data point 754a such that when data operations regarding atomized data point 754a are implemented, ancillary data 753 may be contemporaneously (or substantially contemporaneously) accessed to influence or control a data operation. In one example, a data operation may be a query and ancillary data 753 may include data representing authorization (e.g., credential data) to access atomized data point 754a at a query-level data operation (e.g., at a query proxy during a query). Thus, atomized data point 754a can be accessed if credential data related to ancillary data 753 is valid (otherwise, a request to access atomized data point 754a (e.g., for forming linked datasets, performing analysis, a query, or the like) without authorization data may be rejected or invalidated). According to some embodiments, credential data (e.g., passcode data), which may or may not be encrypted, may be integrated into or otherwise embedded in one or more of identifier data 790a, 790b, and 790c. Ancillary data 753 may be disposed in other data portion of atomized data point 754a, or may be linked (e.g., via a pointer) to a data vault that may contain data representing access permissions or credentials.

Atomized data point 754a may be implemented in accordance with (or be compatible with) a Resource Description Framework ("RDF") data model and specification, according to some embodiments. An example of an RDF data model and specification is maintained by the World Wide Web Consortium ("W3C"), which is an international standards community of Member organizations. In some examples, atomized data point 754a may be expressed in accordance with Turtle (e.g., Terse RDF Triple Language), RDF/XML, N-Triples, N3, or other like RDF-related formats. As such, data unit 752a, association 756, and data unit 752b may be referred to as a "subject," "predicate," and "object," respectively, in a "triple" data point (e.g., as linked data). In some examples, one or more of identifier data 790a, 790b, and 790c may be implemented as, for example, a Uniform Resource Identifier ("URI"), the specification of which is maintained by the Internet Engineering Task Force ("IETF"). According to some examples, credential information (e.g., ancillary data 753) may be embedded in a link or a URI (or in a URL) or an Internationalized Resource Identifier ("TM") for purposes of authorizing data access and other data processes. Therefore, an atomized data point 754 may be equivalent to a triple data point of the Resource Description Framework ("RDF") data model and specification, according to some examples. Note that the term "atomized" may be used to describe a data point or a dataset composed of data points represented by a relatively small unit of data. As such, an "atomized" data point is not intended to be limited to a "triple" or to be compliant with RDF; further, an "atomized" dataset is not intended to be limited to RDF-based datasets or their variants. Also, an "atomized" data store is not intended to be limited to a "triplestore," but these terms are intended to be broader to encompass other equivalent data representations.

Examples of triplestores suitable to store "triples" and atomized datasets (or portions thereof) include, but are not limited to, any triplestore type architected to function as (or similar to) a BLAZEGRAPH triplestore, which is developed by Systap, LLC of Washington, D.C., U.S.A.), any triplestore type architected to function as (or similar to) a STARDOG triplestore, which is developed by Complexible, Inc. of Washington, D.C., U.S.A.), any triplestore type architected to function as (or similar to) a FUSEKI triplestore, which may be maintained by The Apache Software Foundation of Forest Hill, Md., U.S.A.), and the like.

Figure 8:
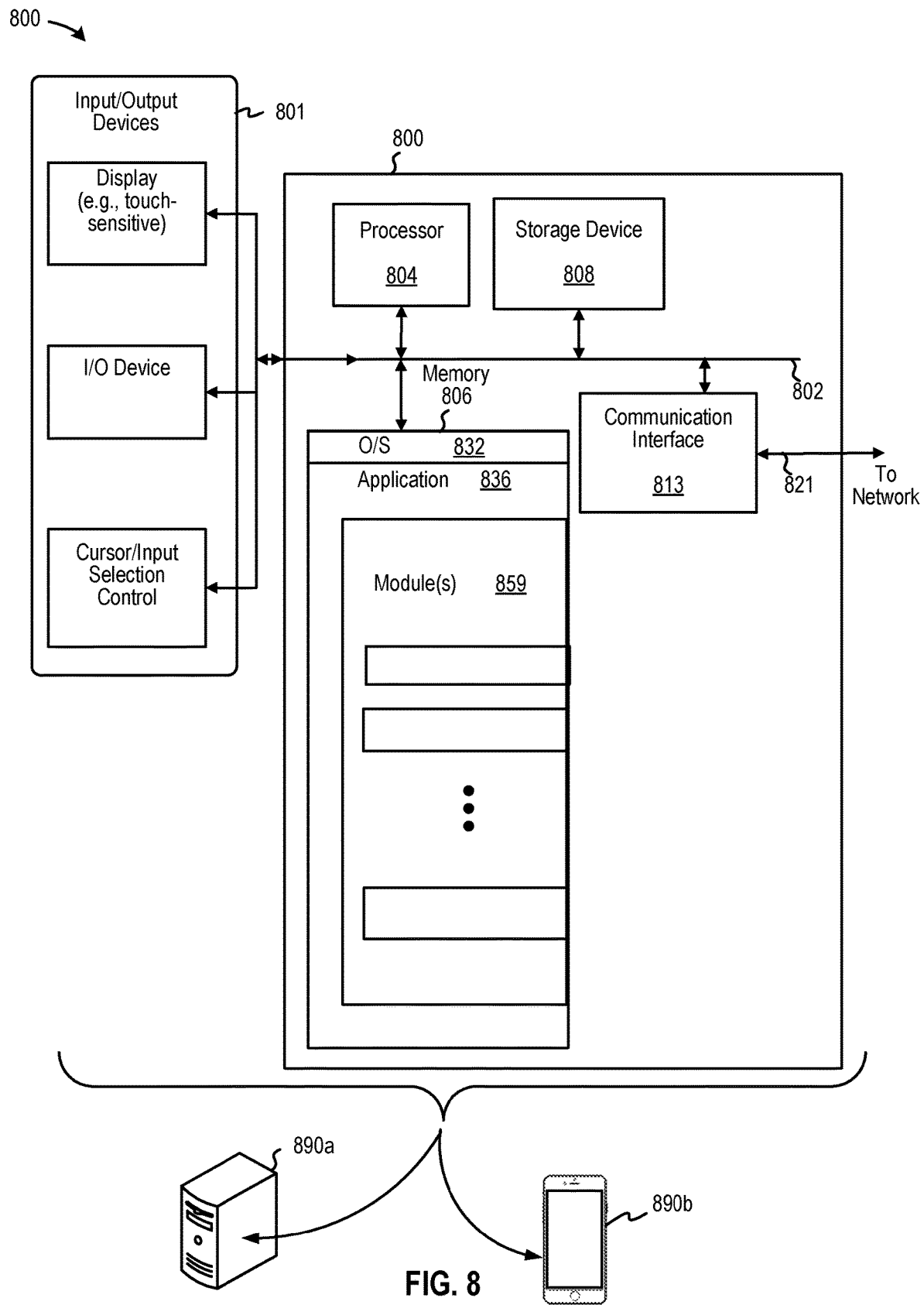
FIG. 8 illustrates examples of various computing platforms configured to provide various functionalities to any of one or more components of a collaborative dataset consolidation system, according to various embodiments.

FIG. 8 illustrates examples of various computing platforms configured to provide various functionalities to any of one or more components of a collaborative dataset consolidation system, according to various embodiments. In some examples, computing platform 800 may be used to implement computer programs, applications, methods, processes, algorithms, or other software, as well as any hardware implementation thereof, to perform the above-described techniques.

In some cases, computing platform 800 or any portion (e.g., any structural or functional portion) can be disposed in any device, such as a computing device 890a, mobile computing device 890b, and/or a processing circuit in association with initiating the formation of collaborative datasets, as well as identifying relevant data of an ingested dataset with one or more linked datasets, according to various examples described herein.

Computing platform 800 includes a bus 802 or other communication mechanism for communicating information, which interconnects subsystems and devices, such as processor 804, system memory 806 (e.g., RAM, etc.), storage device 808 (e.g., ROM, etc.), an in-memory cache (which may be implemented in RAM 806 or other portions of computing platform 800), a communication interface 813 (e.g., an Ethernet or wireless controller, a Bluetooth controller, NFC logic, etc.) to facilitate communications via a port on communication link 821 to communicate, for example, with a computing device, including mobile computing and/or communication devices with processors, including database devices (e.g., storage devices configured to store atomized datasets, including, but not limited to triplestores, etc.). Processor 804 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 800 exchanges data representing inputs and outputs via input-and-output devices 801, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 801 may be implemented as, or otherwise substituted with, a user interface in a computing device associated with a user account identifier in accordance with the various examples described herein.

According to some examples, computing platform 800 performs specific operations by processor 804 executing one or more sequences of one or more instructions stored in system memory 806, and computing platform 800 can be implemented in a client-server arrangement, peer-to-peer arrangement, or as any mobile computing device, including smart phones and the like. Such instructions or data may be read into system memory 806 from another computer readable medium, such as storage device 808, or any other data storage technologies, including blockchain-related techniques. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks and the like. Volatile media includes dynamic memory, such as system memory 806.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by computing platform 800. According to some examples, computing platform 800 can be coupled by communication link 821 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 800 may transmit and receive messages, data, and instructions, including program code (e.g., application code) through communication link 821 and communication interface 813. Received program code may be executed by processor 804 as it is received, and/or stored in memory 806 or other non-volatile storage for later execution.

In the example shown, system memory 806 can include various modules that include executable instructions to implement functionalities described herein. System memory 806 may include an operating system ("O/S") 832, as well as an application 836 and/or logic module(s) 859. In the example shown in FIG. 8, system memory 806 may include any number of modules 859, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. In some examples, the described techniques may be implemented as a computer program or application (hereafter "applications") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including Python™, ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc. The described techniques may be varied and are not limited to the embodiments, examples or descriptions provided.

As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 859 of FIG. 8, or one or more of their components, or any process or device described herein, can be in communication (e.g., wired or wirelessly) with a mobile device, such as a mobile phone or computing device, or can be disposed therein. In some cases, a mobile device, or any networked computing device (not shown) in communication with one or more modules 859 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided. Further, none of the above-described implementations are abstract, but rather contribute significantly to improvements to functionalities and the art of computing devices.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
   identifying subsets of data associated with a data arrangement, the data arrangement including a subset of data;
   computing a compressed data representation for a subset of data, the compressed data representation indicative of a data type to which the subset of data is associated;
   applying the compressed data representation to a plurality of filters each configured to provide a reference compressed data representation, the plurality of filters including one or more match filters each configured to apply a probabilistic data structure to identify a likelihood of matching the reference compressed data representation;
   correlating the compressed data representation to at least one reference compressed data representation to form a correlated compressed data representation as a probabilistic match to a subset of graph data;
   generating a result indicating that a value of the compressed data representation matches the reference compressed data representation;
   detecting one or more links based on the result between the subset of data associated with the correlated compressed data representation to one or more datasets stored in a graph data arrangement being linkable to other graph data arrangements, at least one of the graph data arrangement and the other graph data arrangements including a graph storing data in triple data-based format; and
   forming an expanded data arrangement including supplemented subsets of data of the data type from the other graph data arrangements.

2. The method of claim 1 wherein computing the compressed data representation for the subset of data further comprises:
   receiving data representing the reference compressed data representation including a probabilistic data structure.

3. The method of claim 1 further comprises:
   linking data in a tabular data arrangement to data in the other graph data arrangements, at least one of the graph data arrangements being disposed in a triplestore data repository.

4. The method of claim 1 wherein correlating the compressed data representation comprises:
   identifying a classification type as an identified classification type.

5. The method of claim 4 further comprising:
   detecting at least one link of the one or more links as a function of a digital signature as the correlated compressed data representation,
   wherein the identified classification type is association with the digital signature.

6. The method of claim 1 further comprises:
   generating a compressed data representation for each of the subsets of the graph data to form the plurality of reference compressed data representations.

7. The method of claim 6 further comprises:
   accessing a plurality of datasets stored as graph data in the graph data arrangement disposed in a repository; and
   identifying subsets of data associated with the plurality of datasets.

8. The method of claim 1 wherein computing the compressed data representation for each subset of data comprises:
   executing instructions to perform one or more hash functions.

9. The method of claim 1 wherein computing the compressed data representation for the subset of data comprises:
   applying each subset of data as columnar data to a Bloom filter.

10. The method of claim 1 further comprising:
    detecting an associated subset of data in the graph data arrangements that includes data relevant to the correlated compressed data representation.

11. An apparatus comprising:
    a memory including executable instructions; and
    a processor, responsive to executing the instructions, is configured to:
      identify subsets of data associated with a data arrangement, the data arrangement including a subset of data;
      compute a compressed data representation for a subset of data, the compressed data representation indicative of a data type to which the subset of data is associated;
      apply the compressed data representation to a plurality of filters each configured to provide a reference compressed data representation, the plurality of filters including one or more match filters each configured to apply a probabilistic data structure to identify a likelihood of matching the reference compressed data representation;
      correlate the compressed data representation to at least one reference compressed data representation to form a correlated compressed data representation as a probabilistic match to a subset of graph data;
      generate a result indicating that a value of the compressed data representation matches the reference compressed data representation;
      detect one or more links based on the result between the subset of data associated with the correlated compressed data representation to one or more datasets stored in a graph data arrangement being linkable to other graph data arrangements, at least one of the graph data arrangement and the other graph data arrangements including a graph storing data in triple data-based format; and form an expanded data arrangement including supplemented subsets of data of the data type from the other graph data arrangements.

12. The apparatus of claim 11 wherein the processor is further configured to:

receive data representing the reference compressed data representation including a probabilistic data structure.

13. The apparatus of claim 11 wherein the processor is further configured to:

link data in a tabular data arrangement to data in the other graph data arrangements.

14. The apparatus of claim 11 wherein a subset of the instructions to cause the processor to correlate the compressed data representation further causes the processor to:

identify a classification type as an identified classification type.

15. The apparatus of claim 14 wherein the processor is further configured to:

detect at least one link of the one or more links as a function of a digital signature as the correlated compressed data representation, wherein the identified classification type is association with the digital signature.

16. The apparatus of claim 11 wherein the processor is further configured to:

generate a compressed data representation for each of the subsets of the graph data to form the plurality of reference compressed data representations.

17. The apparatus of claim 16 wherein the processor is further configured to:

access a plurality of datasets stored as graph data in the graph data arrangement disposed in a repository; and identify subsets of data associated with the plurality of datasets.

18. The apparatus of claim 11 wherein a subset of the instructions to cause the processor to compute the compressed data representation for each column of data a subset of the instructions to cause the processor to:

execute instructions to perform one or more hash functions.

19. The apparatus of claim 11 wherein a subset of the instructions to cause the processor to compute the compressed data representation for each column of data a subset of the instructions to cause the processor to:

apply each column of data in the subset of columns to a Bloom filter.

20. The apparatus of claim 11 wherein the processor is further configured to:

detect an associated subset of data in the graph data arrangements that includes data relevant to the correlated compressed data representation.

* * * * *